(12) United States Patent
Sherman et al.

(10) Patent No.: US 12,142,968 B2
(45) Date of Patent: Nov. 12, 2024

(54) LAMINATED SPOKED ROTOR WITH MECHANICAL MAGNET RETENTION

(71) Applicant: Nidec Motor Corporation, St. Louis, MO (US)

(72) Inventors: Jeffrey Scott Sherman, Creve Coeur, MO (US); Chetan O. Modi, Valley Park, MO (US); Steven R. Palmer, Highland, IL (US); Ryan M. Bastien, St. Charles, MO (US); Joey Mitchell Bomar, Glen Carbon, IL (US); Paul G. Michaels, St. Louis, MO (US); Daniel E. Bailey, Ballwin, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 18/194,745

(22) Filed: Apr. 3, 2023

(65) Prior Publication Data

US 2023/0238843 A1    Jul. 27, 2023

Related U.S. Application Data

(63) Continuation of application No. 17/167,873, filed on Feb. 4, 2021, now Pat. No. 11,646,616.

(60) Provisional application No. 62/970,031, filed on Feb. 4, 2020.

(51) Int. Cl.
*H02K 1/276*    (2022.01)
*H02K 1/28*    (2006.01)
*H02K 1/30*    (2006.01)
*H02K 15/03*   (2006.01)

(52) U.S. Cl.
CPC .................... *H02K 1/2773* (2013.01)

(58) Field of Classification Search
CPC .......... H02K 1/28; H02K 1/30; H02K 1/2773; H02K 15/03
USPC ................ 310/156.56, 156.01, 156.53
See application file for complete search history.

(56) References Cited

U.S. PATENT DOCUMENTS

| 2014/0300243 | A1* | 10/2014 | Berkouk | H02K 1/276 |
| | | | | 310/216.048 |
| 2016/0248286 | A1* | 8/2016 | Kaiser | H02K 1/2766 |
| 2017/0288485 | A1* | 10/2017 | Bastien | H02K 1/2773 |

FOREIGN PATENT DOCUMENTS

| CN | 110350694 A | * | 10/2019 |
| DE | 102011222023 A1 | * | 6/2013 |
| JP | 2010154587 A | * | 7/2010 |

* cited by examiner

*Primary Examiner* — Jose A Gonzalez Quinones
(74) *Attorney, Agent, or Firm* — Hovey Williams LLP

(57) ABSTRACT

A rotor assembly for an electric motor includes a rotor core that is fabricated from a plurality of stacked laminations. The rotor core has a plurality of arcuately arranged, axially extending magnet receiving slots. The rotor core includes a plurality of magnets received in respective ones of the magnet receiving slots. The laminations include radially extending deflectable magnet retaining tabs that extend into the magnet receiving slots. The magnet retaining tabs engage and are deflected by a corresponding one of the magnets to exert a reactive force against the magnets.

20 Claims, 25 Drawing Sheets

LAMINATED SPOKED ROTOR WITH MECHANICAL MAGNET RETENTION

CROSS-REFERENCE TO RELATED APPLICATIONS

This is a continuation of U.S. patent application Ser. No. 17/167,873, filed Feb. 4, 2021, and entitled "LAMINATED SPOKED ROTOR WITH MECHANICAL MAGNET RETENTION," which claims priority to U.S. Provisional Patent Application Ser. No. 62/970,031 filed Feb. 4, 2020, and entitled "LAMINATED SPOKED ROTOR WITH MECHANICAL MAGNET RETENTION," the entire disclosure of each of which is hereby incorporated by reference herein.

FIELD OF THE DISCLOSURE

The embodiments described herein relate generally to a rotor assembly for an electric motor. More particularly, embodiments of the present invention concern rotor assemblies having laminated rotor cores with permanent magnets retained by the laminations.

BACKGROUND

Permanent magnets (ferrite and Neodymium) are used in rotors of electronically controlled motors. These magnets are often placed in openings or slots of laminated rotor cores at predetermined positions for best motor performance. The magnets must be retained in the rotor core to prevent movement during motor operation and shipping and handling. Typically, this is often achieved through the application of high strength adhesive between the rotor core and magnets. However, in addition to the cost associated with adhesives, adhesives require additional processing such as cleaning the parts for proper adhesion, adhesive curing equipment, and time to develop the proper bond strength. Secondary retention components such as caps or retainers require additional components and processes to install them. Overmolding and other processes requiring heat can demagnetize or reduce magnet strength reducing motor performance.

It is known that many rotor cores are constructed with multiple layers of thin steel, laminated together to form the rotor core. These individual layers (also known as laminations) are typically individually rotated by some degree prior to being assembled in order to prevent the inherent camber in each lamination from accumulating during assembly of the rotor.

Some known rotor cores include laminations that have spring fingers integrated into the structure of each lamination of the rotor core. The pattern of spring fingers is such that every other lamination is identical, with the pattern repeating every two lamination layers. By axially inserting magnets between these spring fingers, the mechanical interference between the fingers and magnets retains the magnets to the rotor via friction. However, such laminated rotors are susceptible to manufacturing variation in the size of the laminations and magnets. The 50/50 nature of this solution (where every other layer is identical) may result in large interferences and high material deformation when magnets are oversized. Conversely, such manufacturing may result in small interferences with some material deformation when magnets are undersized. This raises the possibility of manufacturing fallout in high volume production, and it also may cause difficulty in scaling such a design (modifying the size) for new motor applications.

SUMMARY

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a rotor assembly for an electric motor is provided. The rotor assembly includes a rotor core having a plurality of laminations stacked along a rotational axis of the electric motor. The rotor core defines a plurality of radially extending magnet receiving slots extending axially through the rotor core. Each of the laminations include a central body portion and an outer body portion, where the central body portion is substantially enclosed within the outer body portion. The rotor assembly also includes a plurality of magnets. Each magnet is received in a respective magnet receiving slot of the rotor core. Further, each of the laminations include a radially extending deflectable magnet retaining tab that extends radially outward from the central body portion into a corresponding one of the magnet receiving slots. The magnet retaining tabs engage and are deflected by a corresponding one of the magnets to exert a reactive force against the magnets therebetween.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
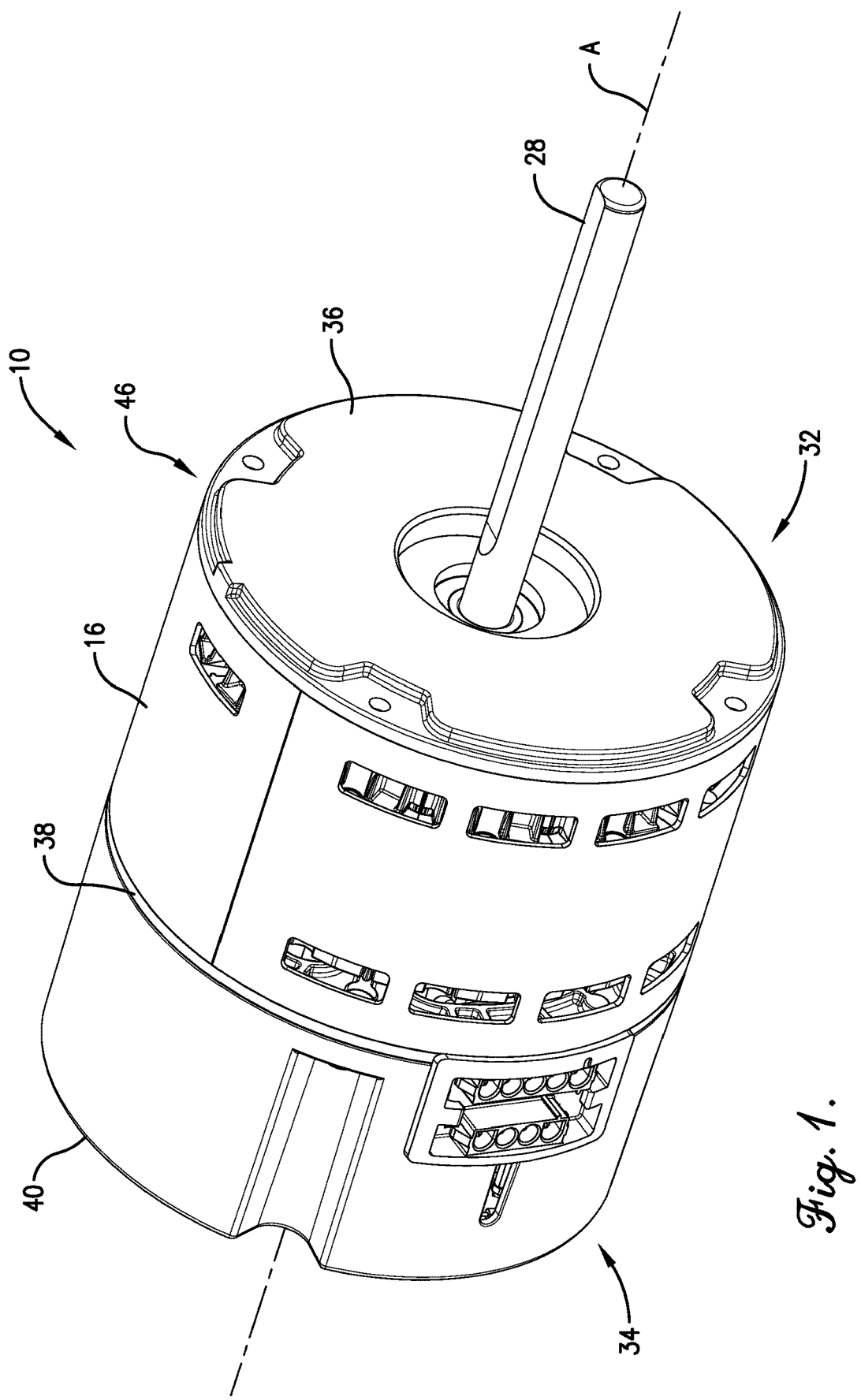
FIG. 1 is a perspective view of an exemplary electric motor, in accordance with one aspect of the present invention.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations extending substantially parallel to a longitudinal or rotational axis of the motor assembly. The terms "radial" and "radially" refer to directions and orientations extending substantially perpendicular to the rotation axis. The terms "tangent" and "tangential" refer to the directions and orientations extending substantially perpendicular to a radial direction of the motor assembly. In addition, as used herein, the terms "circumferential" and "circumferentially" refer to directions and orientations extending in the general direction around the rotation axis of the motor assembly (such references not being limited to pure circular extension or to the periphery or outer perimeter of the object unless the context clearly indicates otherwise). Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Broadly, this disclosure provides geometry in the laminated rotor core magnet slots that retain the magnets in position when they are pressed into the rotor core. The methods described herein eliminate the need for additional retention methods, such as adhesives, additional retention components, and encapsulating materials, which include plastic over-molding or shrinkable membranes. In particular, the embodiments described herein provides a series of deformable tabs sized and shaped to create interference fits with a magnet as it is pressed into a rotor core magnet slot. Radially extending tabs are located on alternating slots of a lamination so that indexing (rotating) each lamination of the rotor core creates spaces for deforming the tab geometry. The hardness of the magnet material and the softness of the steel material used for making laminations dictate an increase or decrease of the number and/or size of the tabs to achieve acceptable press-in forces and press-out forces.

An advantage of this design is that it eliminates the need for secondary components and processes, which translates to significant cost reductions and productivity improvements. An added benefit is the ability to press in magnets that are already magnetized. Magnetizing magnets within a rotor core is an inefficient process which limits the performance of the motor.

Example Electric Motor

Figure 2:
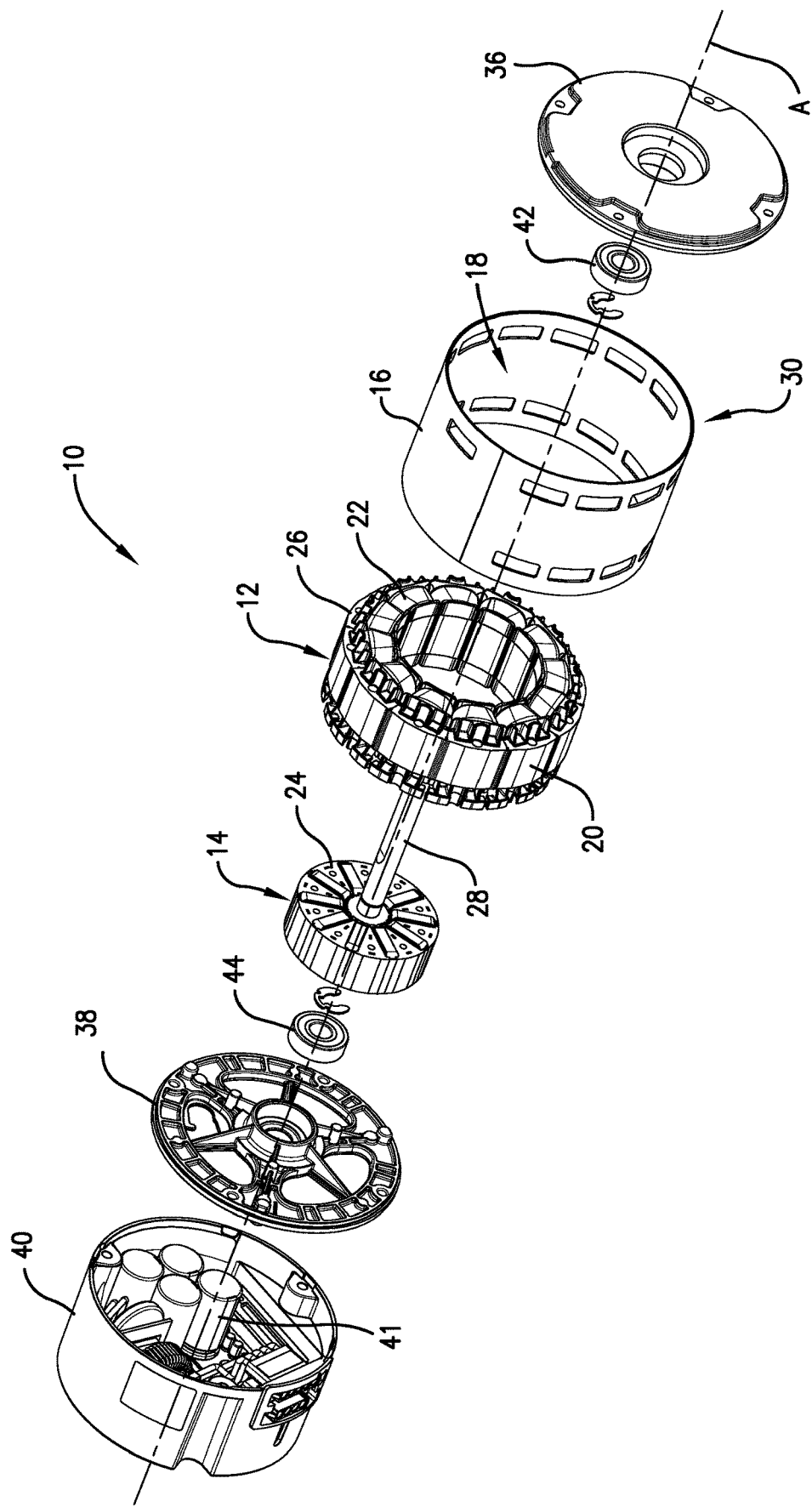
FIG. 2 is an exploded perspective view of at least a portion of the electric motor shown in FIG. 1.

FIG. 1 is a perspective view of an exemplary electric motor 10, in accordance with one aspect of the present invention. FIG. 2 is an exploded perspective view of at least a portion of the electric motor 10. In the exemplary embodiment, the electric motor 10 is illustrated as an inner rotor motor. As will be described, an inner rotor motor has magnets positioned radially inward relative to windings, which function as a stator. However, according to some aspects of the present invention, the electric motor 10 may alternately be an outer rotor motor or dual rotor motor.

As shown in FIGS. 1 and 2, the illustrated electric motor 10 broadly includes a stator assembly 12 and a rotor assembly 14 substantially enclosed within an outer shell 16. The rotor assembly 14 is supported for rotation relative to the stator assembly 12 about an axis of rotation "A." The outer shell 16 is generally cylindrical in shape and includes a cavity 18 for receiving at least a portion of the stator assembly 12 and the rotor assembly 14. In the exemplary embodiment, a controller housing 40, enclosing control electronics 41 for controlling operation of the electric motor 10, is coupled to an end of the electric motor 10.

The stator assembly 12 is generally toroidal in form and defines a stator axis that is coaxial with the axis of rotation "A." However, according to some aspects of the present invention, it is permissible for the axes to be non-coaxial. The stator assembly 12 preferably includes a stator core 20 and a plurality of coils 22 wound about the stator core 20. Furthermore, in some embodiments, the stator assembly 12 includes a plurality of electrically insulative coverings 26 positioned between the stator core 20 and the coils.

The stator core 20 preferably is fabricated from steel and may be of either solid or laminated construction. Alternatively, or additionally, the stator core 20 may be segmented in form. However, according to certain aspects of the present invention, the stator core 20 may be fabricated from any one or more of a variety of suitable materials and/or construction methods.

The stator core 20 preferably includes an annular yoke (not shown) and a plurality of arcuately spaced apart teeth (not shown) extending at least generally radially inward from the yoke. It is contemplated that the stator core 20 can have any number of teeth that enables the electric motor 10 to function as described herein. The plurality of coils 22 are formed by electrically conductive wiring being wound about each of the teeth. The wiring encircles each tooth to form the coils 22, with each of the coils 22 corresponding to one of the teeth. The wiring is preferably copper, although aluminum or any one or more of a variety of electrically conductive materials may be used without departing from the scope of the present invention.

In the exemplary embodiment, the rotor assembly 14 is depicted as a brushless permanent magnet rotor assembly and includes a rotor core 24 and a rotor shaft 28, which defines a rotation axis for the rotor assembly 14. (The rotor assembly 14 also includes a plurality of magnets 48, as will be described below.) The rotation axis of the rotor assembly 14 is coaxial with the axis of rotation "A." It is noted, that according to certain aspects of the present invention, the rotor core 24 may be constructed for use in an electric generator or other electric machine that includes a stator assembly 12.

The rotor core 24 is generally cylindrical in form and preferably is fabricated from steel. The rotor core 24 may be of either solid or laminated construction. Alternatively, or additionally, the rotor core 24 may be segmented in form. However, according to certain aspects of the present invention, the rotor core 24 may be fabricated from any one or more of a variety of suitable materials and/or construction methods.

As described above, the electric motor 10 includes the outer shell 16. The outer shell 16 is generally cylindrical in shape and extends generally circumferentially about the stator assembly 12. Alternatively, according to certain aspects of the present invention, the outer shell 16 may extend about the stator assembly 12 in such a way as to provide one or more flat sides or to be otherwise alternatively shaped. In the exemplary embodiment, the outer shell 16 presents axially opposite first and second shell ends 32 and 34, respectively, and extends substantially continuously about the stator assembly 12 and rotor assembly 14 to enclose, at least in part, the stator assembly 12 and the rotor assembly 14. According to certain aspects of the present invention, the outer shell 16 includes openings or slots therethrough. For example, in certain embodiments, one or more openings or slots may be provided to facilitate ventilation and/or access.

The outer shell 16 forms a portion of a motor case 46 of the electric motor 10. The motor case 46 includes the outer shell 16 and first and second endshields 36 and 38, respectively. The outer shell 16 and the first and second endshields 36 and 38 cooperatively define a motor chamber 30 that at least substantially receives the stator assembly 12 and the rotor assembly 14. More particularly, the first endshield 36 is positioned adjacent the first shell end 32 and coupled thereto. In addition, the second endshield 38 is positioned adjacent the second shell end 34 and coupled thereto. Specifically, the outer shell 16 is coupled to and held in place between the first and second endshields 36 and 38 by a plurality of fasteners (not shown) extending between and coupled to the endshields 36 and 38. It is contemplated that, in certain aspects of the present invention, one more of the first and second endshields 36 and 38 may be located inwardly or spaced outward from the respective shell ends 32 and 34.

The electric motor 10 includes first and second bearing assemblies 42 and 44 that cooperatively rotatably support the rotor shaft 28 of the rotor assembly 14. The first endshield 36 is configured to support the first bearing assembly 42, and the second endshield 38 is configured to support the second bearing assembly 44. Alternative or additional bearing assembly supports may be provided without departing from the scope of the present invention.

Rotor Assembly

Figure 3:
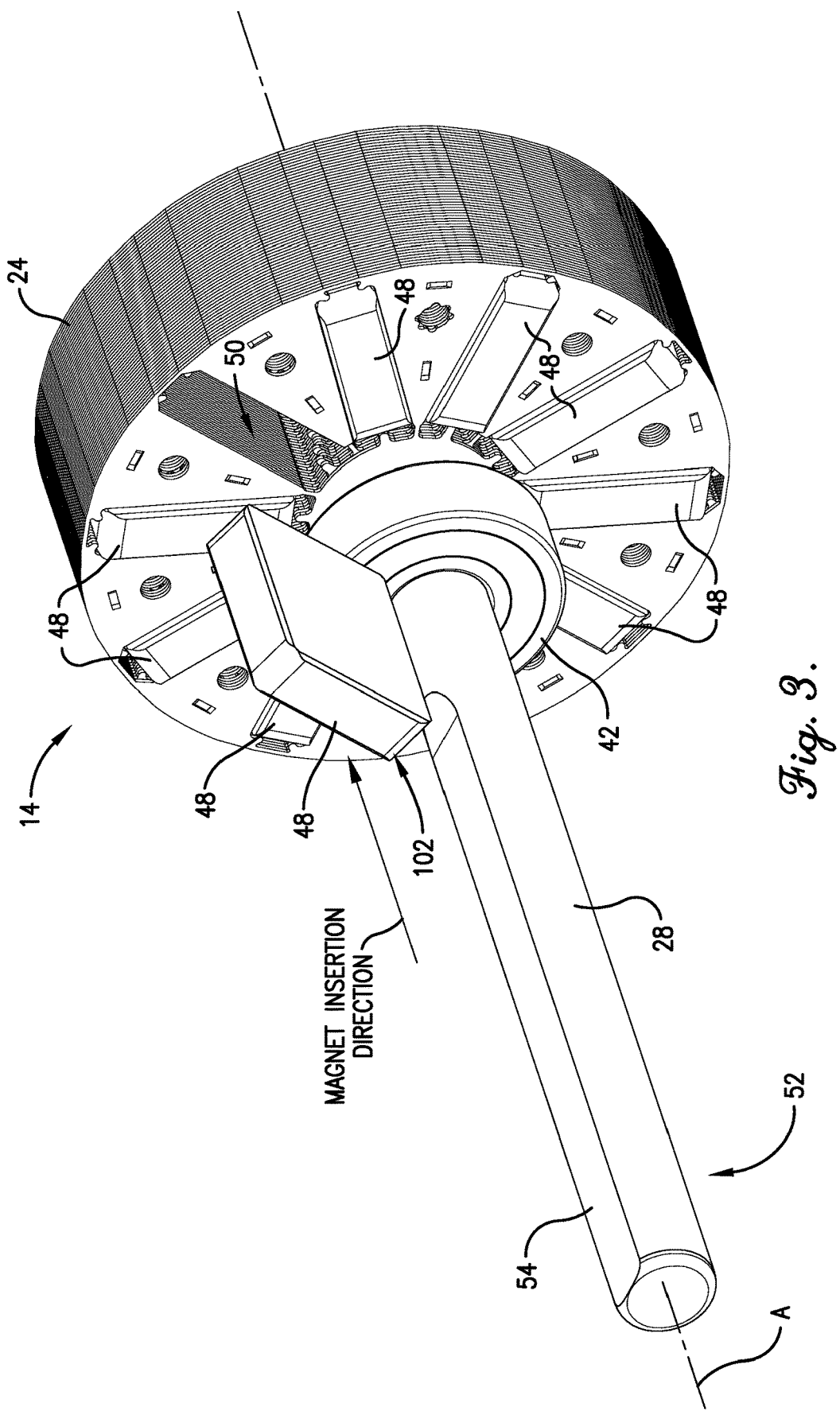
FIG. 3 is a perspective view of a rotor assembly of the electric motor shown in FIG. 1, illustrating the insertion of a permanent magnet into an axially extending magnet receiving slot of the rotor core.

FIG. 3 is a perspective view of the rotor assembly 14 of the electric motor 10 illustrating the insertion of a permanent magnet 48 into an axially extending magnet receiving slot 50 of the rotor core 24. In one suitable embodiment, the rotor shaft 28 extends axially through the rotor core 24 to define the rotation axis "A." As described herein, the rotor assembly 14 includes a plurality of permanent magnets 48. In the exemplary embodiment, the rotor shaft 28 is fixedly coupled to the rotor core 24 and positioned concentrically relative thereto. The rotor shaft 28 includes a first end 52 that extends forward from the rotor core 24 and a shorter second end (not shown) that extends rearward from the rotor core 24. The first end 52 includes a flat surface 54 defined thereon, although, in some aspects of the present invention, the flat surface 54 may be omitted. In the exemplary embodiment, the rotor core 24 and the magnets 48 are rigidly coupled together and are configured to rotate with the rotor shaft 28.

Figure 4:
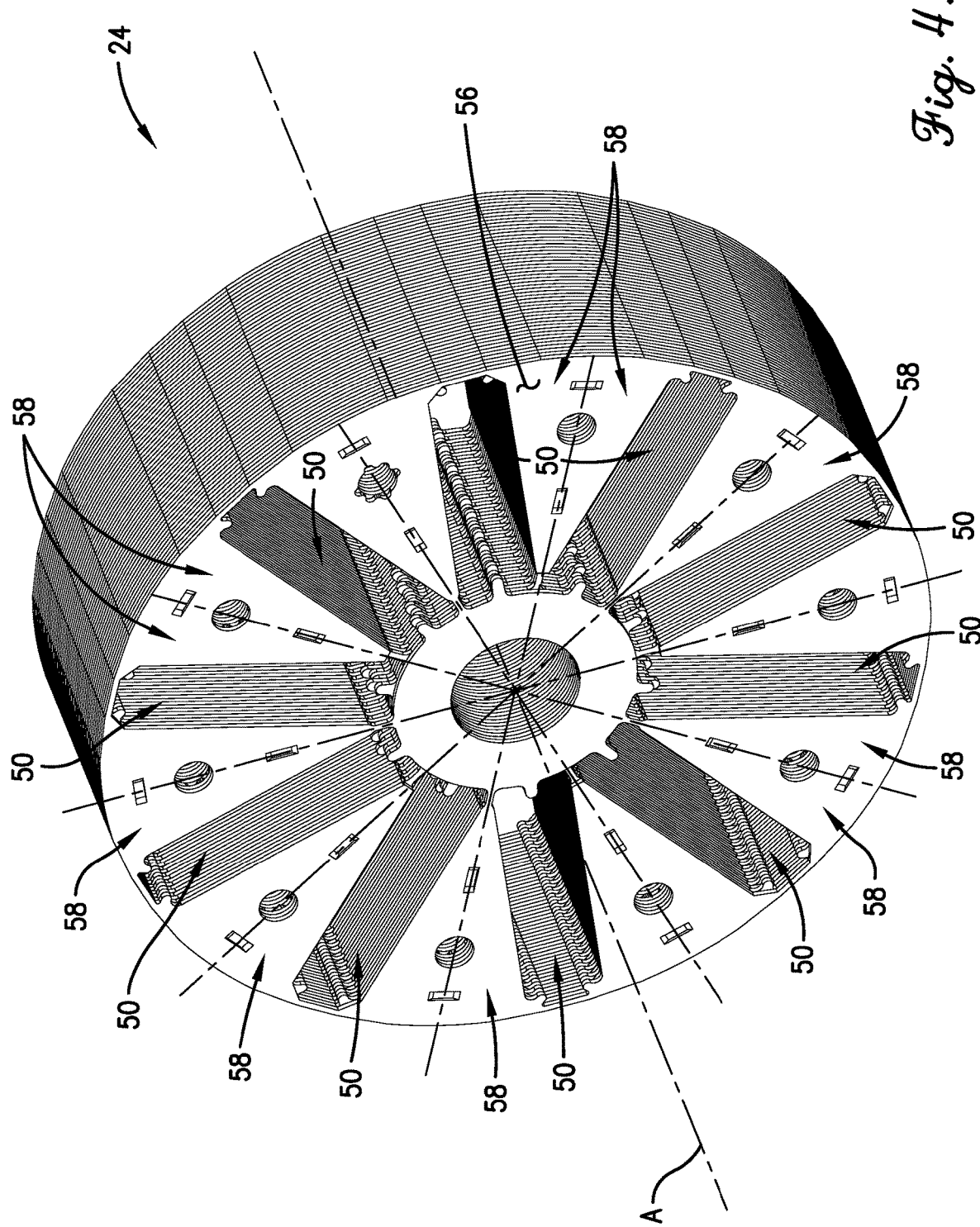
FIG. 4 is a perspective of the rotor core of the rotor assembly shown in FIG. 3.

FIG. 4 is a perspective of the exemplary rotor core 24. In the exemplary embodiment, the rotor core 24 is fabricated from a plurality of laminations 56, each of which may be rotated or arcuately offset at various angles about the rotation axis "A." The laminations 56 are in the form of plates stacked or placed one on top of the other in face-to-face contact such that the rotor core 24 extends axially along the rotation axis "A" a predetermined length. As such, each lamination presents opposite axial faces, with one of the faces facing a first axial direction and the other facing the opposite axial direction. The plurality of laminations 56 are preferably interlocked (e.g., coupled to each other), although certain aspects of the present invention contemplate the use of loose laminations. In the exemplary embodiment, each lamination 56 is fabricated (e.g., punched, stamped, machined, etc.) from a suitable sheet material, including, for example, and without limitation, a magnetically permeable material, such as iron, a steel, or a steel alloy. It is noted, that in various aspects of the present invention, the laminations may include laminations having different forms or may include laminations having substantially the same form.

In the exemplary embodiment, the rotor core 24 includes a plurality of generally radially extending magnet receiving slots 50 extending axially through the rotor core 24, where the slots 50 extend substantially parallel to the rotation axis "A." The magnet slots 50 are circumferentially positioned at substantially regular intervals about the rotation axis "A." Each of the magnet slots 50 has a predefined slot width and is configured to receive at least one of the magnets 48 therein. As is described herein, each magnet slot 50 is positioned within a pole sector 58 of the rotor assembly 14. The illustrated embodiment includes ten (10) magnet slots 50, thus defining ten (10) rotor pole sectors 58. It is noted that in other aspects of the present invention, the rotor core 24 may include more or fewer pole sectors 58, depending on design requirements. It is also noted that the magnets 48 are shown schematically for purposes of illustration but are generally sized to fit tightly within the magnet slots 50 to facilitate a secure, non-moving fit with the rotor core 24. Although the illustrated embodiment depicts a single magnet 48 extending substantially the full axial length of the corresponding magnet slot 50, aspects of the present invention contemplate multiple axially arranged magnets 48 within each magnet slot 50.

Figure 5:
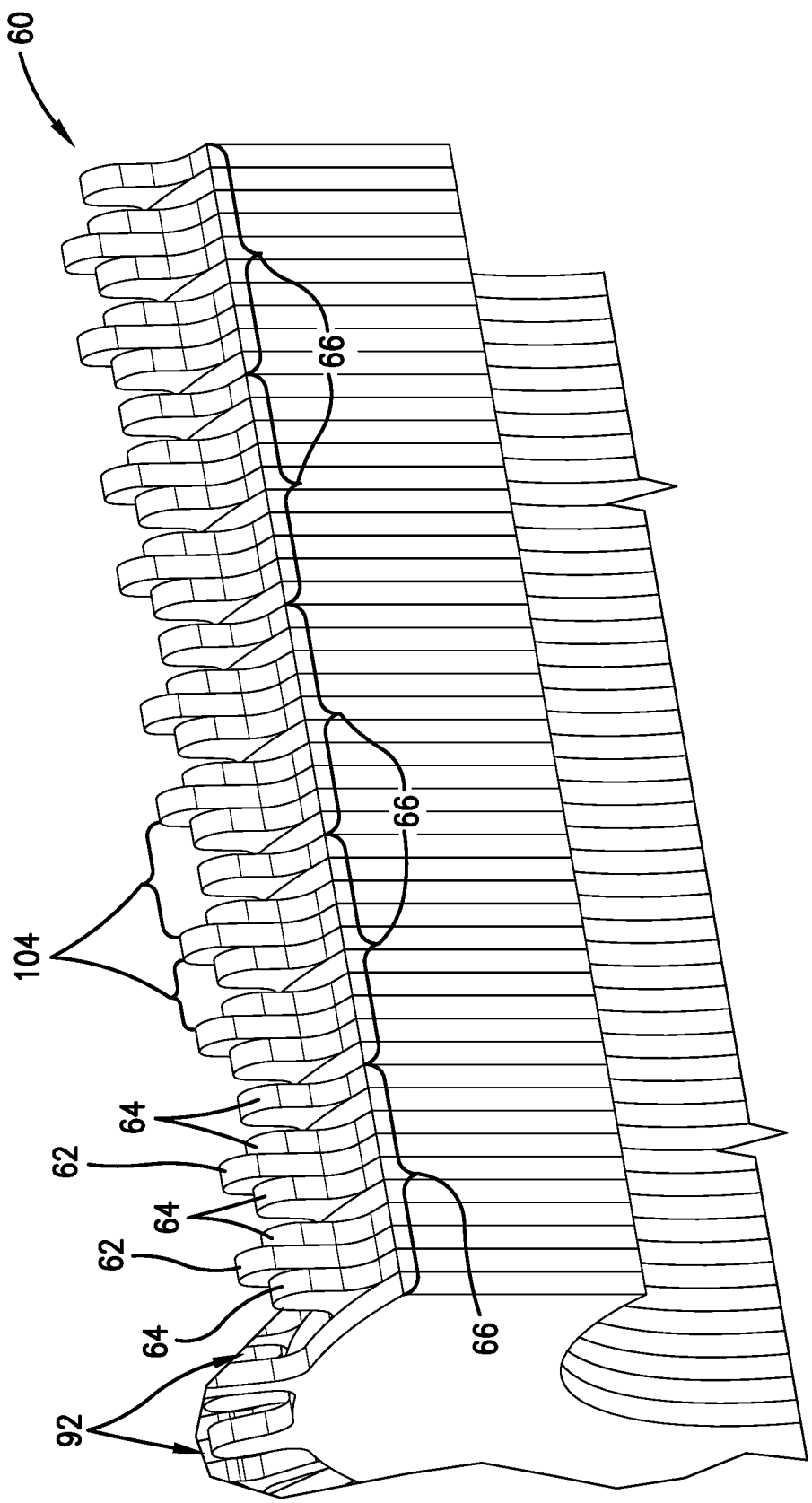
FIG. 5 is an enlarged sectional view of a portion of the rotor core shown in FIG. 4, illustrating a magnet slot pattern of alternating deflectable magnet retaining tabs and support posts.

FIG. 5 is an enlarged sectional view of a portion of the rotor core 24 taken axially along a magnet slot 50 and illustrating a magnet slot pattern 60 of alternating deflectable magnet retaining tabs 62 and support posts 64, in accordance with one aspect of the present invention. The magnet slot pattern 60 includes a plurality of repeating patterns 66. In the exemplary embodiment, each repeating pattern 66 is formed by a stack of ten (10) laminations 56. However, in other aspects of the present invention, the repeating patterns 66 can be formed from a stack of twenty (20) single laminations 56, where each section of the pattern includes two (2) laminations, or from lamination stacks that are multiples of ten (10). For example, each section of the repeating pattern 66 can include three (3) laminations such that a repeating pattern 66 includes thirty (30) total laminations.

In the exemplary embodiment depicted in FIG. 5, each repeating pattern 66 includes, in serial arrangement from left to right, a void (i.e., no tab or post), a support post 64, a deflectable magnet retaining tab 62, a support post 64, a void, a support post 64, a deflectable magnet retaining tab 62, a support post 64, a void, and a support post 64. In such embodiments, each repeating pattern 66 would be formed by a stack of ten (10) laminations 56 and multiples thereof, as described above. It is noted that the repeating patterns 66, and as such, the magnet slot pattern 60, are non-directional. That is, the magnets 48 may be inserted into each magnet slot 50 in either axial direction.

Figure 6:
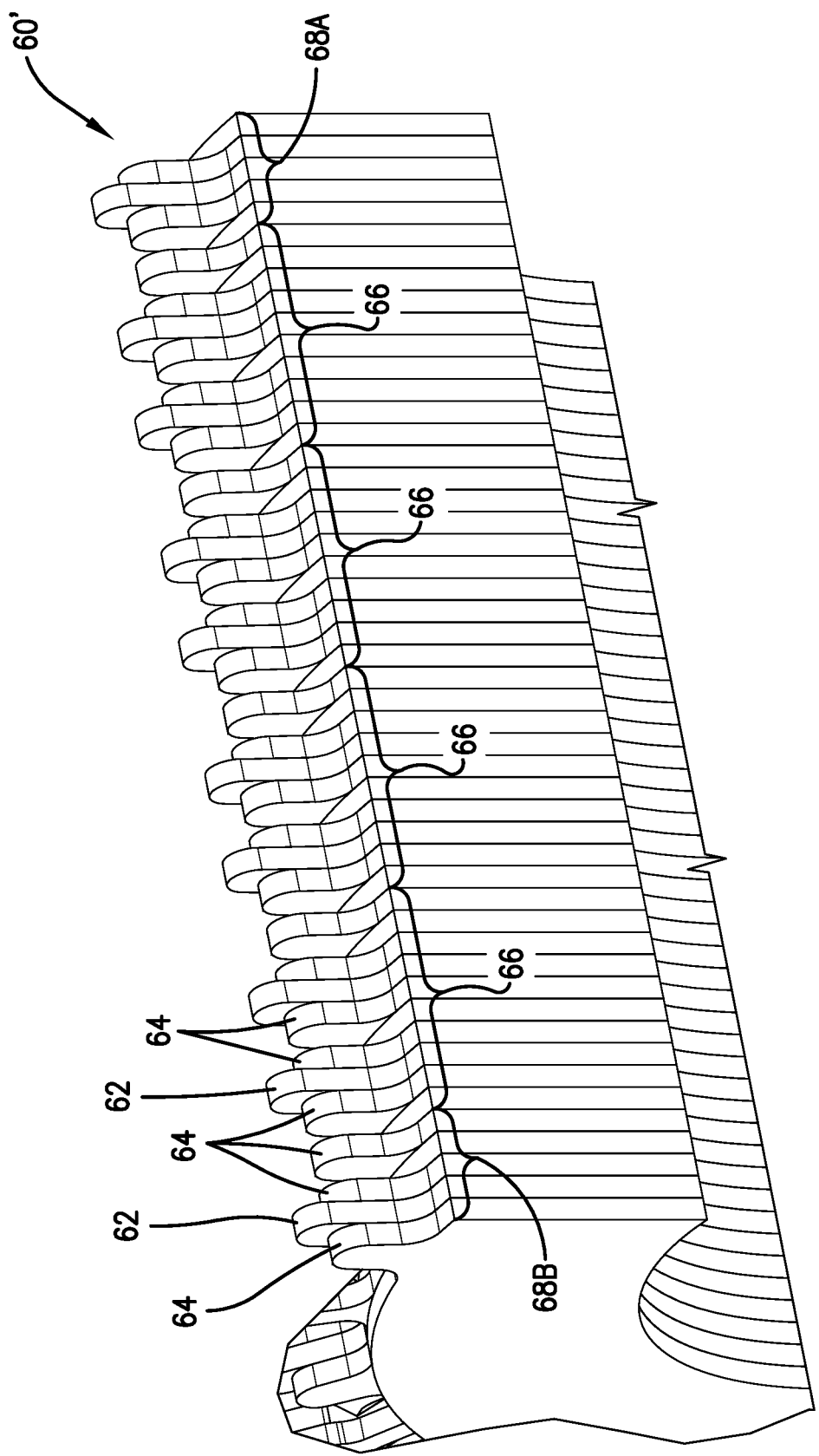
FIG. 6 is an enlarged sectional view of a portion of the rotor core shown in FIG. 4, illustrating a "wrapped" magnet slot pattern of alternating deflectable magnet retaining tabs and support posts.

In the exemplary embodiment, the general magnet slot pattern 60 can be described as being "wrapped" from one end to the other. For example, as shown in FIG. 6, different magnet slot patterns 60 may be "shifted" axially on the rotor core 24 along the rotation axis "A." As such, a repeating pattern 66 located at an end of a respective magnet slot pattern 60 may be "wrapped" around to the other end of the magnet slot pattern 60. For example, FIG. 6 is an example of a "wrapped" magnet slot pattern, indicated as a magnet slot pattern 60', as compared to the magnet slot pattern 60 shown in FIG. 5. In this example, an end repeating pattern 66 is broken into two parts 68A and 68B, with the part 68A containing a first portion of a repeating pattern 66 and the part 68B containing a second portion of the pattern that is "wrapped" around to the beginning of the magnet slot pattern 60' to finish the repeating pattern 66. The "wrapping" effect of the magnet slot pattern 66 is a result of using substantially similar laminations 56 in the lamination stack defining the rotor core 24, where the laminations 56 are rotated or arcuately offset about the rotation axis "A" by a predetermined amount, as is described further herein.

Figure 7:
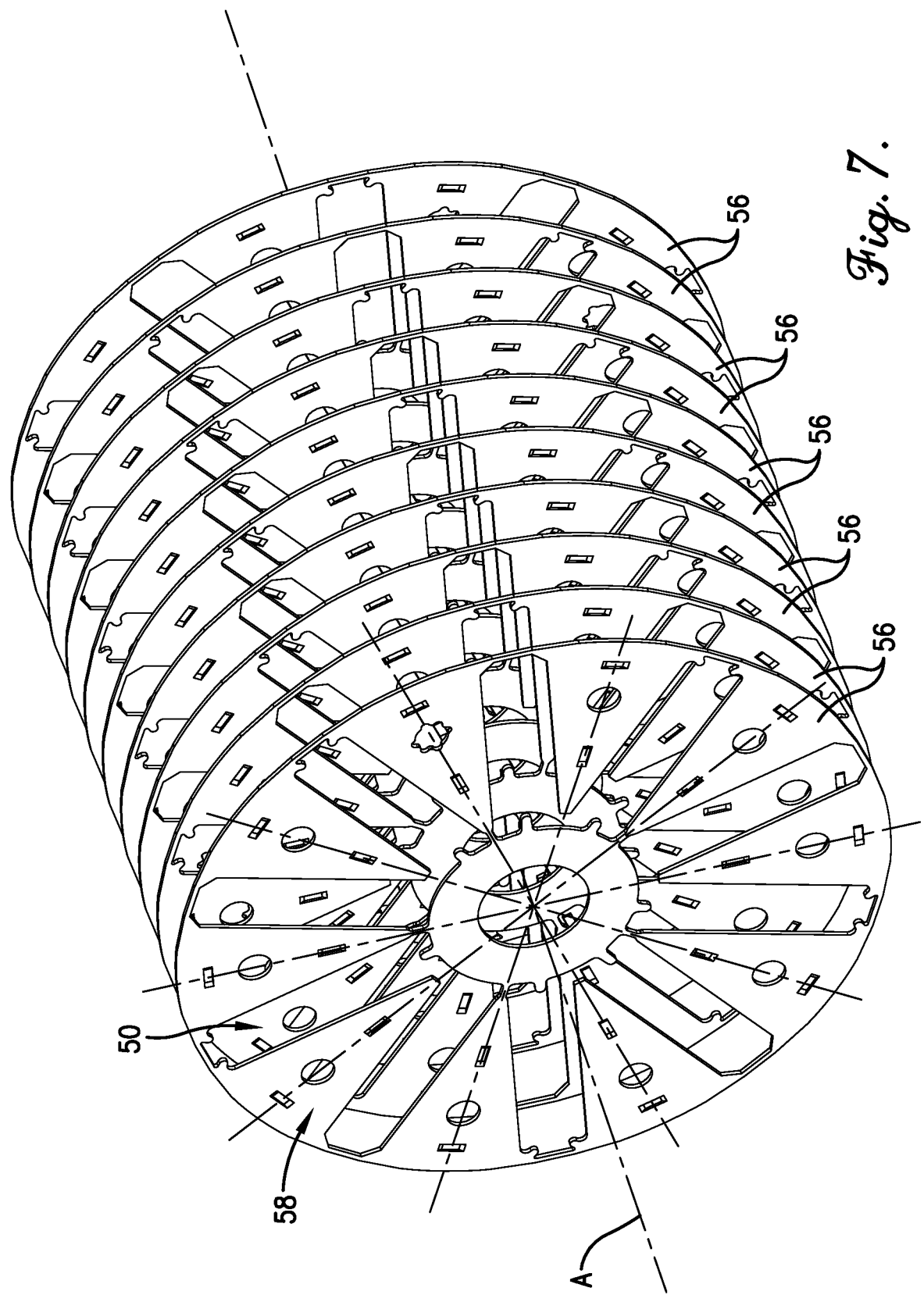
FIG. 7 is a perspective view of a stack of ten (10) laminations of the rotor core shown in FIGS. 2-4 that define a plurality of repeating patterns of alternating deflectable magnet retaining tabs and support posts, shown in FIGS. 5 and 6.

FIG. 7 is an exploded perspective view of a stack of ten (10) laminations 56 that define a plurality of repeating patterns 66 (shown in FIGS. 5 and 6), wherein circumferentially adjacent repeating patterns 66 are axially offset or "wrapped" from one end of the lamination stack to the other. As described herein, the exemplary rotor core 24 is a ten (10) pole rotor core. Each lamination 56 shown in FIG. 7 is substantially the same. However, to define the repeating patterns 66 for each magnet slot 50, axially adjacent laminations 56 are rotated in the same direction about the rotation axis "A" an amount equal to one (1) pole sector 58 relative to adjacent laminations. In other aspects of the present invention, the laminations 56 may be rotated about the rotation axis "A" any alternative amount that enables the rotor core 24 to function as described herein.

Exemplary Lamination

Figure 8:
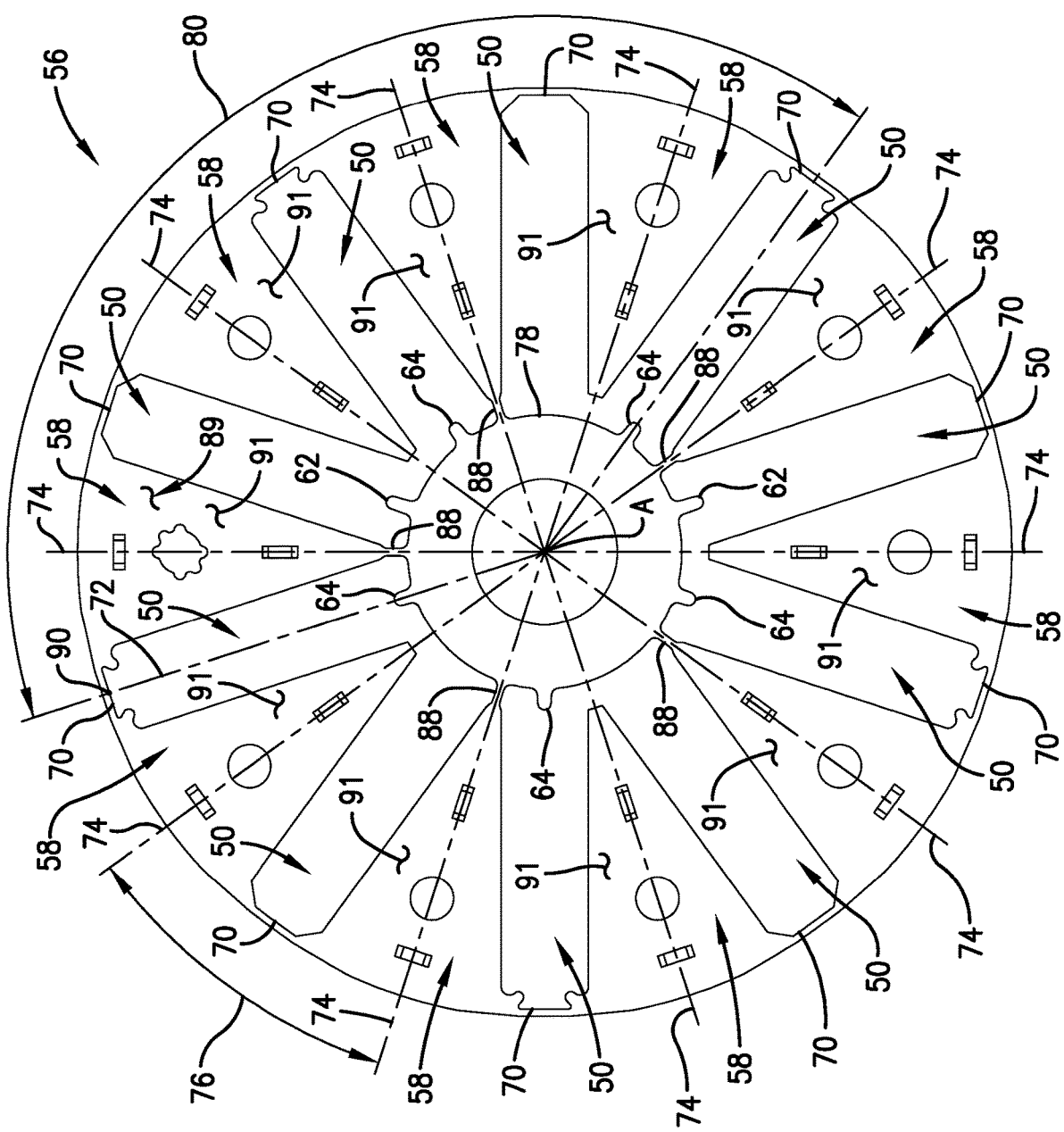
FIG. 8 is a front view of one of the laminations shown in FIG. 7, in accordance with one aspect of the present invention.
Figure 9:
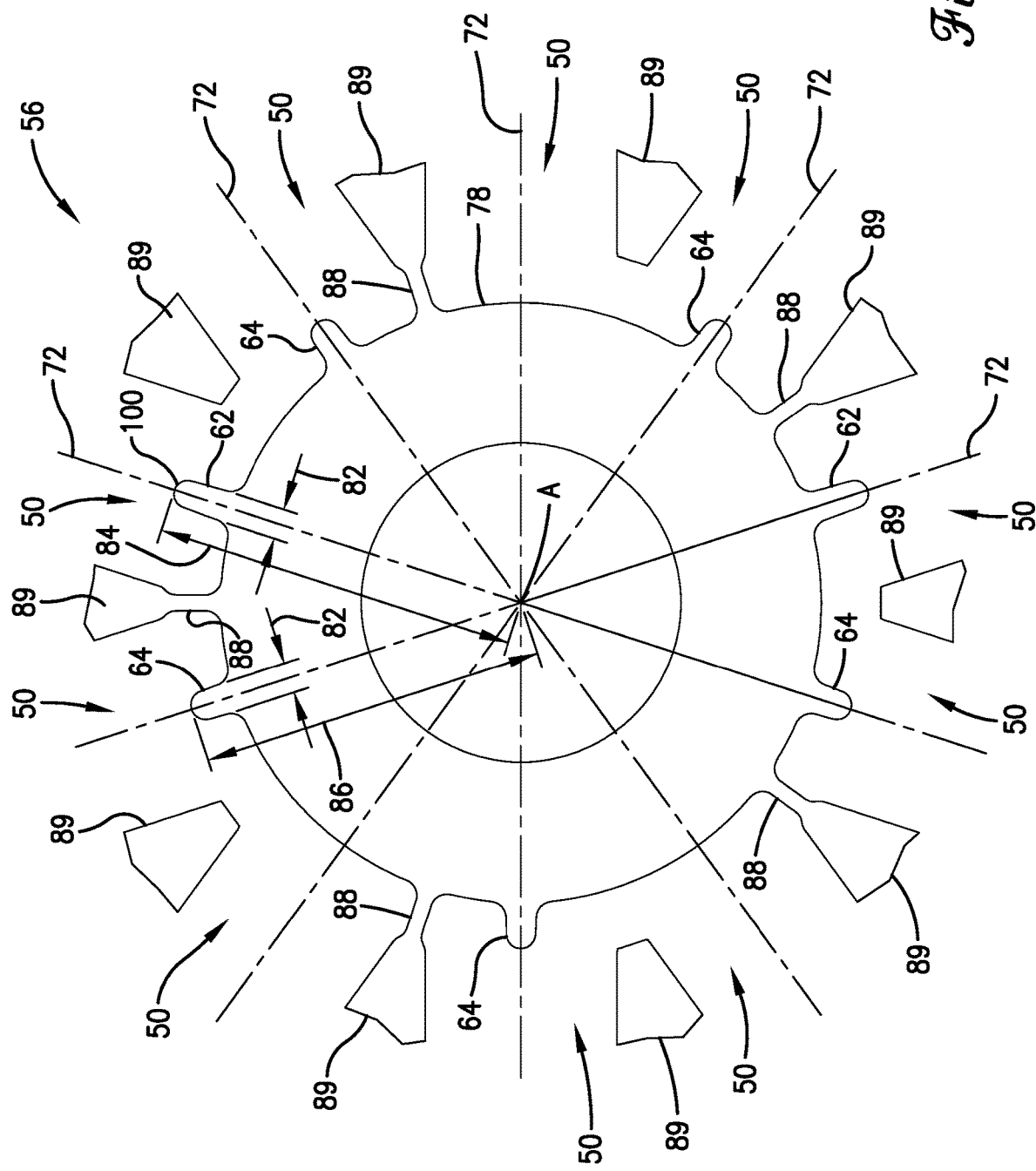
FIG. 9 is an enlarged view of a central portion of the lamination shown in FIG. 8, illustrating the configuration of the deflectable magnet retaining tabs and support posts.
Figure 10:
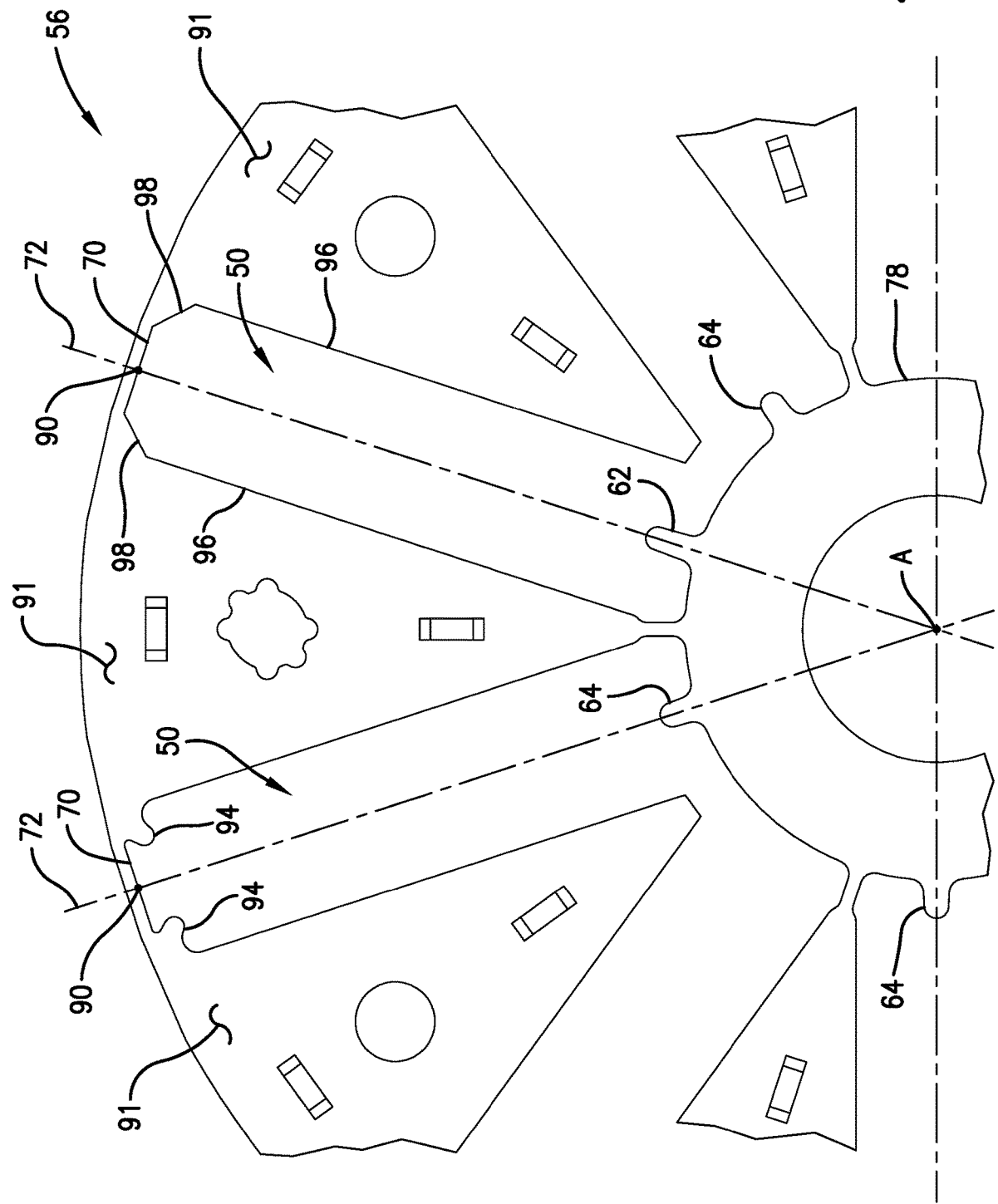
FIG. 10 is an enlarged view of a portion of the lamination shown in FIG. 8, illustrating the configuration of outer end portions of the magnet slots.

FIG. 8 is a front view of a lamination 56, in accordance with one aspect of the present invention. FIG. 9 is an enlarged view of the central portion of the lamination 56 shown in FIG. 8, illustrating the configuration of the deflectable magnet retaining tabs 62 and the support posts 64. FIG. 10 is an enlarged view of a portion of the lamination 56 shown in FIG. 8, illustrating the configuration of outer end portions of the magnet slots 50. Referring to FIG. 8, as described above, the lamination 56 defines ten (10) pole sectors 58. Each of the magnet slots 50 are positioned radially outward from the rotation axis "A" of the rotor core 24, which is shown as the center of the lamination 56.

As shown in FIGS. 8 and 10, the lamination 56 includes a central body portion 78 and an outer body portion 89. The outer body portion 89 substantially encloses the central body portion 78 therein. In the exemplary embodiment, the outer body portion 89 is defined, in part, by a plurality of pole segments 91 arcuately arranged about the rotation axis "A." The pole segments 91 are preferably evenly spaced, defining the magnet slots 50 between adjacent pairs of the pole segments 91. Preferably, each pole segment 91 includes a pair of sidewalls 96, which define, in part, a respective magnet slot 50. In addition, each pole segment 91 is coupled to an adjacent pole segment 91 via a bridge portion defining a substantially planar outer magnet surface 70.

In the exemplary embodiment, the outer magnet surface 70 is formed substantially perpendicular to a central slot axis 72. The outer magnet surface 70 defines a slot center point 90 of the magnet slot 50 coincident with the central slot axis 72. Referring to FIG. 8, a plurality of radial pole pitch lines 74 extend through the center of the lamination 56 (e.g., the rotation axis "A"), with each radial pole pitch line 74 being centered angularly between an adjacent pair of the magnet slots 50 such that each adjacent pair of the magnet slots 50 are disposed symmetrically about the respective radial pole pitch line 74. Each radial pole pitch line 74 defines the boundary between two adjacent pole sectors 58, wherein adjacent radial pole pitch lines 74 define a pole sector 58 therebetween. Each central slot axis 72 passes through the rotation center of the lamination 56 and bisects the respective pole sector 58 (e.g., is angularly centered between adjacent radial pole pitch lines 74). In FIG. 8, only one slot axis 72 and slot center point 90 is shown for clarity.

As used herein, a pole pitch angle is defined as the angle between identical points on two adjacent pole sectors 58. For example, and without limitation, a pole pitch angle 76 of the lamination 56 is illustrated in FIG. 8 as the angle between adjacent radial pole pitch lines 74, where each central slot axis 72 is positioned between the adjacent radial pole pitch lines 74 at an angle equal to one-half of the pole pitch angle 76. The pole pitch angle is determined by dividing three hundred and sixty degrees (360°) (one full turn of the rotor) by the number of pole sectors 58 of the rotor core 24. For example, in the exemplary embodiment, the ten (10) pole rotor core 24 has a pole pitch angle 76 equal to thirty-six degrees (36°), e.g., three hundred and sixty degrees (360°) divided by ten (10) poles.

Referring to FIG. 9, in the exemplary embodiment, the lamination 56 includes two (2) deflectable magnet retaining tabs 62 extending radially outward from a central body portion 78 of the lamination 56. Each magnet retaining tab 62 is positioned and substantially centered in a respective magnet slot 50. Each magnet retaining tab 62 extends radially outward along the central slot axis 72 and defines a post portion. Each magnet retaining tab 62 is located opposite the outer magnet surface 70 to facilitate providing an outward radial force to a magnet 48, thereby forcing the magnet 48 outward toward the outer magnet surface 70. The post portion of the magnet retaining tab 62 includes a distal retaining tab end. The distal retaining tab end defines an arcuate engagement surface 100 projecting from the post portion, which is configured for engagement with a magnet 48 at a radially outermost distal tip. Alternatively, in other embodiment, the distal retaining tab end of the magnet retaining tab 62 may define any non-arcuate engagement surface that enables the magnet retaining tab 62 to function as described herein.

In addition to the two (2) deflectable magnet retaining tabs 62, the lamination 56 includes a plurality of support posts 64. In particular, the lamination 56 includes a respective support post 64 positioned in each magnet slot 50 adjacent to the magnet slot 50 containing the magnet retaining tab 62. That is, each magnet slot 50 on either side of the magnet retaining tab 62 contains a respective support post 64. Each support post 64 is substantially centered in its respective magnet slot 50, extending radially outward along the central slot axis 72 and being located opposite the outer magnet surface 70. Furthermore, the lamination 56 includes one (1) additional support post 64 positioned in a magnet slot 50 flanked on either side by empty magnet slots 50 (i.e., magnet slots that are void of any support post 64 or magnet retaining tab 62). More particularly, as illustrated in FIGS. 8 and 9, the lamination 56 is fabricated with a rotational serial pattern of one (1) support post 64, one (1) magnet retaining tab 62, one (1) support post 64, and one (1) empty magnet slot 50. The rotational serial pattern has a rotational symmetry about the rotation axis (indicated by point "A") of four (4) pole pitch angles, as indicated by reference character 80 in FIG. 8. The additional support post 64 is located in the adjacent magnet slot 50 after the rotational pattern described above.

Referring to FIG. 9, each of the magnet retaining tabs 62 and support posts 64 are formed as radially extending posts having a full rounded distal end (e.g., the arcuate engagement surface 100 of the magnet retaining tabs 62) and a predetermined base width 82. In the exemplary embodiment, the base width 82 is less than about one-fourth (¼) a width of a corresponding magnet receiving slot 50. In a preferred embodiment of the lamination 56, the base width 82 is in a range between and including about four hundredths of an inch (0.04") and about six hundredths of an inch (0.06"). However, in other aspects of the present invention, the base width 82 may include any alternative measures that enable the lamination 56 to function as described herein. The above range increases strength and decreases manufacturing costs of the lamination 56. It is noted that in certain embodiments, the magnet retaining tabs 62 and support posts 64 have a base width 82 along a length of the respective tab or post that is substantially constant or equal in measure. In other embodiments, however, a measure of the base width 82 of the magnet retaining tabs 62 and support posts 64 progressively decreases in a radial outward direction along a radial length of the magnet retaining tabs 62 and support posts 64. Most preferably, the magnet retaining tabs 62 and support posts 64 may taper radially outward at a taper angle of about five degrees (5°). For example, the taper angle may be in a range between and including about four degrees (4°) and about six degrees (6°).

The magnet retaining tabs 62 extend radially outward a predetermined length 84 as measured from the rotation axis (indicated by point "A") to the outer most point of the arcuate engagement surface 100. The length 84 is selected to enable the arcuate engagement surface 100 to engage with a radially inward side 102 of the permanent magnet 48 (shown in FIG. 3) to exert a reactive force against the magnet 48 and secure the magnet 48 in place. In a preferred embodiment of the lamination 56, the length 84 is in a range between and including about fifty-three hundredths of an inch (0.53") and about fifty-five hundredths of an inch (0.55"). However, in other aspects of the present invention, the length 84 may include any alternative measures that enable the lamination 56 to function as described herein. The above range increases strength and decreases manufacturing costs of the lamination 56.

Likewise, the support posts 64 extend radially outward a predetermined length 86 as measured from the rotation axis (indicated by point "A"). The length 86 is selected to provide clearance between a radially outermost distal support post end of the support post 64 and the magnet 48. Further, the length 86 is selected to provide limited support to an axially adjacent magnet retaining tab 62 against bending in an axial direction of the rotor core 24. The predetermined length 86 can be selected to provide a predetermined amount of support to an adjacent magnet retaining tab 62. In a preferred embodiment of the lamination 56, the length 86 is in a range between and including about five tenths of an inch (0.50") and about fifty-two hundredths of an inch (0.52"). However, in other aspects of the present invention, the length 86 may include any alternative measures that enable the lamination 56 to function as described herein. The above range increases strength and decreases manufacturing costs of the lamination 56.

Referring back to FIGS. 5 and 6, it is depicted that the magnet retaining tabs 62 and support posts 64 are axially aligned when a plurality of laminations 56 are stacked to define the rotor core 24. As described above, each of the magnet retaining tabs 62 and support posts 64 have substantially the same width and are centered on a respective central slot axis 72. As such, axially adjacent magnet retaining tabs 62 and support posts 64 substantially overlap one another in the axial direction of the rotor core 24.

As shown in FIGS. 8 and 9, the lamination 56 includes a plurality of spoke portions 88 extending between the central body portion 78 and the outer body portion 89 of the lamination 56. The spoke portions 88 extend from every other pole segment 91, i.e., are positioned between every other pair of adjacent magnet slots 50. Accordingly, a respective spoke portion 88 is positioned two (2) pole pitch angles 76 either side of another spoke portion 88. In this manner, referring back to FIG. 5, a plurality of spoke gaps 92 are defined axially along a length of a stack of rotationally offset laminations 56, which define the rotor core 24. The spoke gaps 92 facilitate increasing an electrical efficiency of the electric motor 10.

As shown in FIGS. 8 and 10, the lamination 56 includes alternating distal end configurations defining the magnet slots 50. In particular, every other magnet slot 50 has a pair of distal magnet tabs 94 projecting inwardly from the planar outer magnet surface 70. The distal magnet tabs 94 are substantially symmetrical with respect to the central slot axis 72 of the magnet slot 50. Each tab 94 extends from an outer corner defined by the outer magnet surface 70 and a corresponding pole segment 91. Each extends generally radially inward and toward the central slot axis 72. The distal magnet tabs 94 are sized and shaped to facilitate positioning the magnets 48 in place. The tabs facilitate eliminating tolerance stack-up difficulties during assembly of the rotor core 24 due to typical manufacturing tolerances of the laminations 56.

An adjacent magnet slot 50 is partially defined by a pair of transitions 98 extending between the outer magnet surface 70 and the sidewalls 96 of adjacent pole segments 91. The transitions 98 are linear in the example embodiment. However, the transitions 98 may be any shape that enables the lamination 56 to function as described herein. For example, and without limitation, in one embodiment, the transitions 98 may be semi-circular. The transitions 98 are sized and shaped to provide clearance between the outer magnet surface 70 and the magnets 48.

It is noted that the angles discussed above, such as the pole pitch angles 76, are geometric and are expressed as mechanical degrees. For the design of electric motors, electrical degrees are also employed so that results can be generalized. It is noted that each pole pitch angle 76 (or pole sector 58) of the rotor assembly 14 is equal to one hundred and eighty electrical degrees (180° electrical), as the magnetic poles are one hundred and eighty electrical degrees (180° electrical) apart.

In operation, the rotor assembly 14 is assembled by first fabricating a plurality of laminations 56. As described above, the laminations 56 may be fabricated from a suitable sheet material, including, for example, and without limitation, a magnetically permeable material, such as iron, a steel, or a steel alloy, by punching, stamping, machining, and/or using other suitable lamination forming techniques. Most preferably, as the laminations 56 are fabricated, they are oriented and stacked as described herein. The rotor assembly 14 may preferably contain laminations 56 that are interlocked (e.g., coupled to each other), although certain aspects of the present invention contemplate the use of loose laminations.

Figure 11:
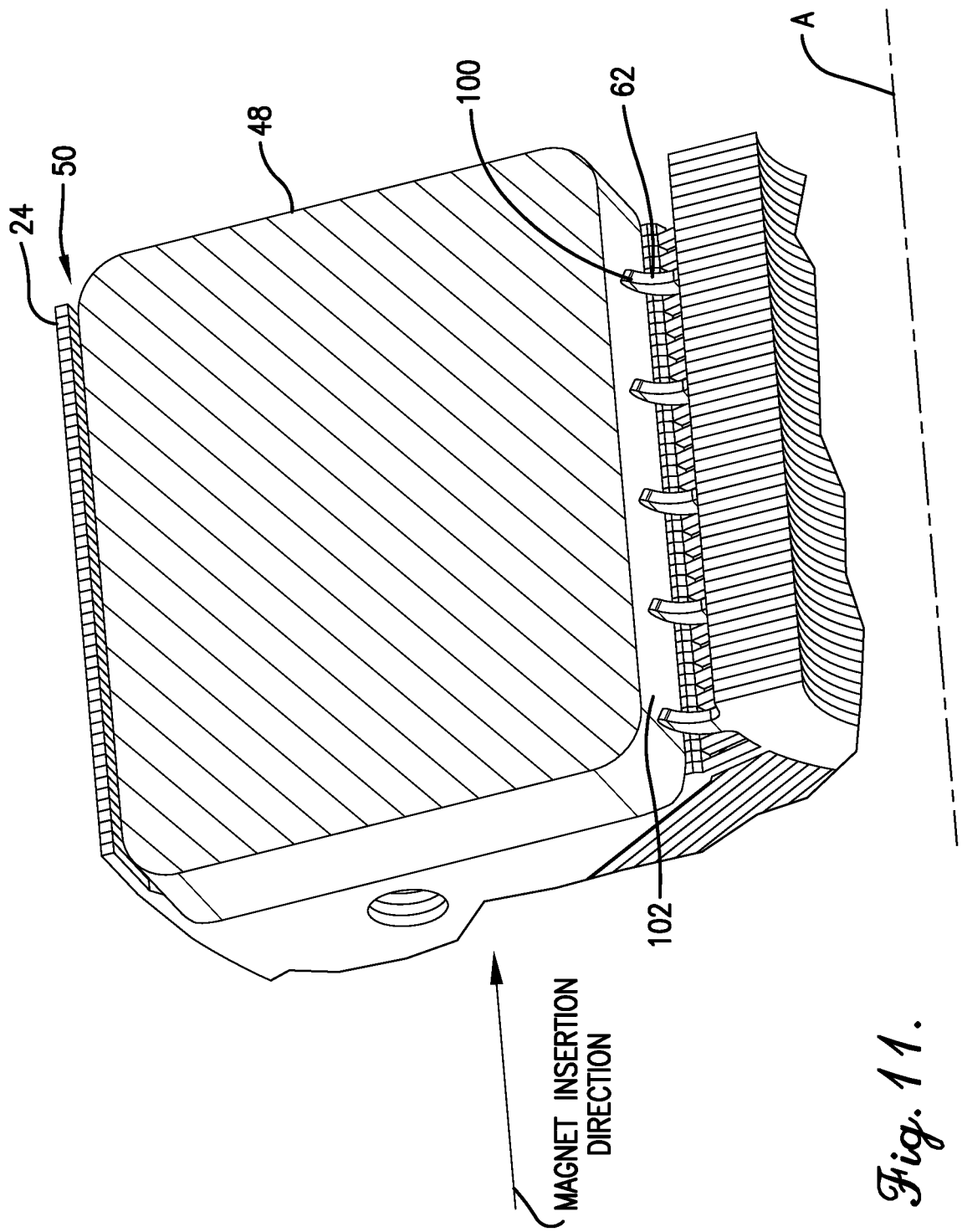
FIG. 11 is an enlarged view of a portion of the rotor core shown in FIG. 4, illustrating the deflection of the magnet retaining tabs as a permanent magnet is inserted during assembly.

FIG. 11 is an enlarged view of a portion of the rotor core 24, illustrating the deflection of the magnet retaining tabs 62 as a permanent magnet 48 is inserted during assembly. The support posts 64 are not shown in FIG. 11 for clarity. In the exemplary embodiment, at least one permanent magnet 48 is inserted into each magnet slot 50 in a first axial direction, as indicated by the arrow. For example, and without limitation, the magnets 48 are each pressed axially into a respective magnet slot 50. It is noted that the magnets 48 may be pressed individually into the magnet slots 50 or may be pressed in multiples, up to and including, simultaneous pressing of all the magnets 48 into the magnet slots 50. As the magnet 48 is pressed into a respective magnet slot 50, the arcuate engagement surfaces 100 of the magnet retaining tabs 62 contact the radially inward side 102 of the permanent magnet 48, causing the magnet retaining tabs 62 to deflect, for example, in the axial direction.

While not shown in FIG. 11, it is noted that the axially adjacent support posts 64 (shown in FIGS. 9 and 10) provide partial support to the magnet retaining tabs 62 to facilitate limiting or controlling the axial bending of the magnet retaining tabs 62. The axial bending of the magnet retaining tabs 62 provides a reactive force against the magnets 48, and in particular, the radially inward sides 102 of the magnets 48, to hold the magnets 48 in place. In addition to providing support to the magnet retaining tabs 62, the support posts 64 also provide an axial gap 104 (shown in FIG. 5) between the serially spaced magnet retaining tabs 62. This enables the magnet retaining tabs 62 to deflect a predetermined amount without interfering with each other.

In certain aspects of the present invention, it is contemplated that at least one permanent magnet 48 may be inserted into each magnet slot 50 of the rotor core 24 in a second axial direction, opposite of the arrow shown in FIG. 3 or 11. For example, and without limitation, the magnets 48 are each pressed axially into a respective magnet slot 50. The magnets 48 inserted in the first axial direction and the opposing magnets 48 inserted in the second axial direction are pressed axially along a length of the rotor core 24 such that the magnets in a respective magnet slot 50 contact each other in face-to-face contact.

Alternative Laminations

Figure 12:
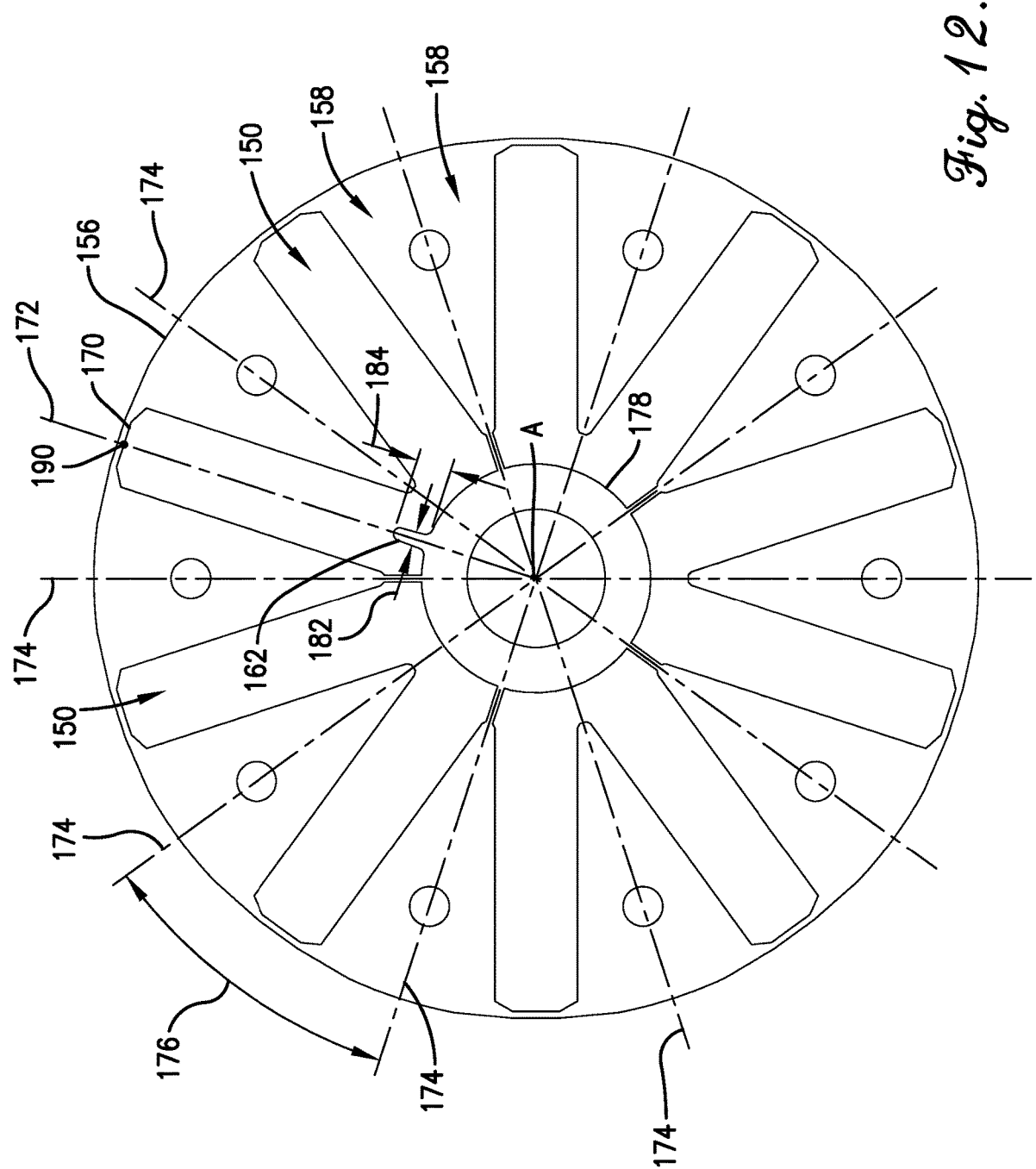
FIG. 12 is a plan view of an alternative lamination that may be used to construct a rotor core, similar to that shown in FIG. 4.
Figure 13:
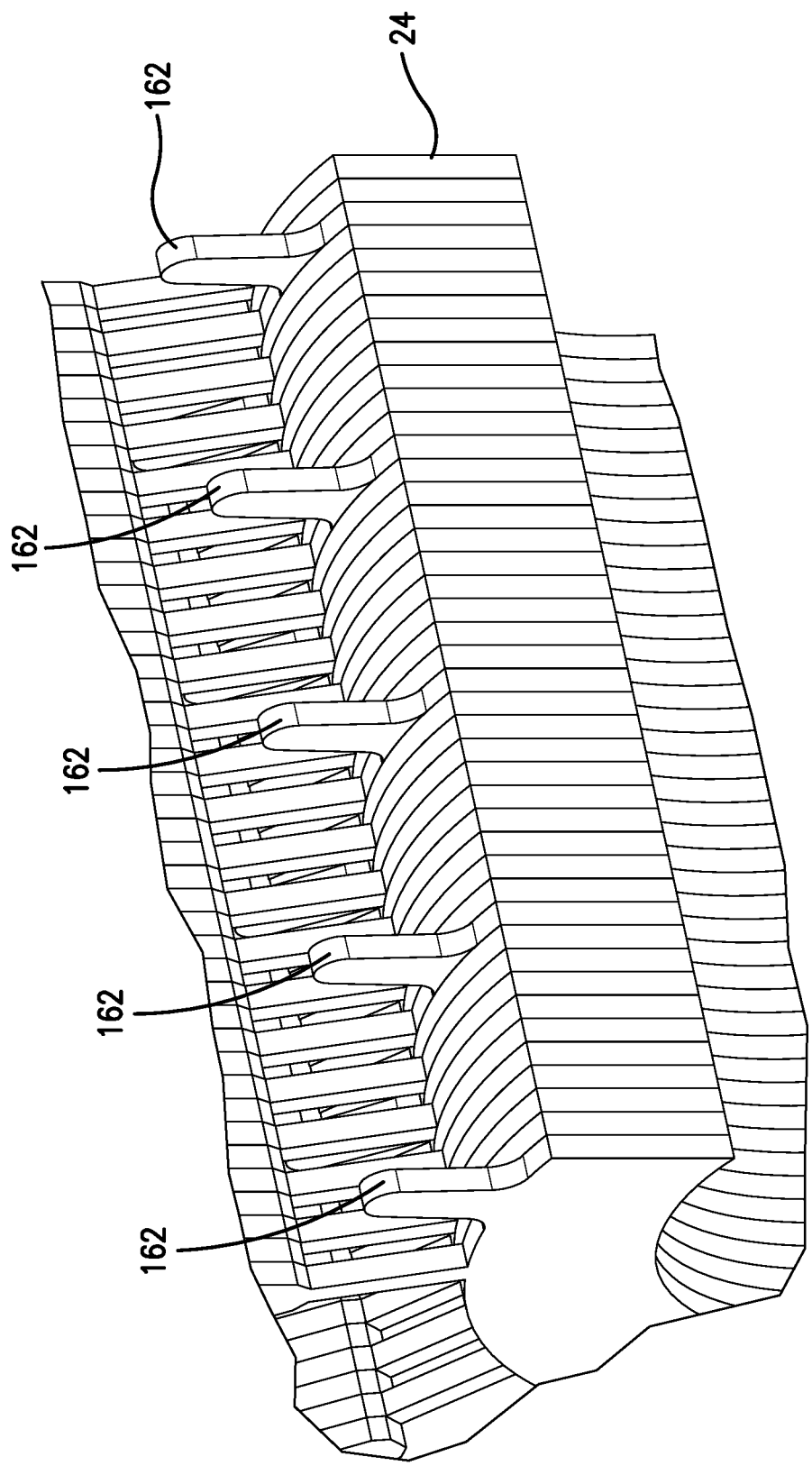
FIG. 13 is an enlarged section view of a portion of the rotor core constructed with a stack of the laminations shown in FIG. 12.

FIG. 12 is a front view of an alternative lamination 156 that may be used to construct a rotor core, similar to that shown in FIG. 4. FIG. 13 is an enlarged section view of a portion of the rotor core constructed with a stack of laminations 156. In the illustrated embodiment, the lamination 156 defines ten (10) pole sectors 158. A plurality of magnet slots 150 are positioned radially outward from a rotation axis "A" of the lamination 156, which is shown as the center point of the lamination 156. Each magnet slot 150 is partially defined by a substantially planar outer magnet surface 170 that is formed substantially perpendicular to a central slot axis 172. The magnet surface 170 defines a slot center point 190 of the magnet slot 150 coincident with the central slot axis 172.

A plurality of radial pole pitch lines 174 extend through the center of the lamination 156 (e.g., the rotation axis "A"), with each radial pole pitch line 174 being centered angularly between an adjacent pair of the magnet slots 150 such that each adjacent pair of the magnet slots 150 are disposed symmetrically about the respective radial pole pitch line 174. Each radial pole pitch line 174 defines the boundary between two adjacent pole sectors 158, wherein adjacent radial pole pitch lines 174 define a pole sector 158 therebetween. Each central slot axis 172 passes through the rotation center of the lamination 156 and bisects the respective pole sector 158 (e.g., is angularly centered between adjacent radial pole pitch lines 174). In FIG. 12, only one slot axis 172 is shown for clarity.

A pole pitch angle is defined as the angle between identical points on two adjacent pole sectors 158. For example, and without limitation, a pole pitch angle 176 of the lamination 156 is illustrated in FIG. 12 as the angle between adjacent radial pole pitch lines 174, where each central slot axis 172 is positioned between the adjacent radial pole pitch lines 174 at an angle equal to one-half of the pole pitch angle 176. The pole pitch angle is determined by dividing three hundred and sixty degrees (360°) (one full turn of the rotor) by the number of pole sectors 158 of the lamination 156. For example, in the exemplary embodiment, the ten (10) pole lamination 156 has a pole pitch angle 176 equal to thirty-six degrees (36°), e.g., three hundred and sixty degrees (360°) divided by ten (10) poles.

In the depicted embodiment, the lamination 156 includes a single deflectable magnet retaining tab 162 but does not include any support posts. The deflectable magnet retaining tab 162 extend radially outward from a central body portion 178 of the lamination 156. The magnet retaining tab 162 is substantially centered in the magnet slot 150, extending along the central slot axis 172. As illustrated in FIG. 12, the magnet retaining tab 162 is located opposite the outer magnet surface 170 to facilitate providing an outward radial force to a magnet, such as the magnet 48 (shown in FIG. 3), thereby forcing the magnet 48 toward the outer magnet surface 170.

The magnet retaining tab 162 is formed as a radially extending post having a predetermined width 182 that enables the lamination 156 to function as described herein. In addition, the magnet retaining tab 162 extends radially outward from the central body portion 178 a predetermined length 184 selected to engage with the radially inward side 102 of the permanent magnet 48 to exert a reactive force against and secure the magnet 48 in place.

In the exemplary embodiment, a stack of ten (10) laminations 156 is provided. The laminations 156 are placed in face-to-face contact with each other. Each lamination 156 in the stack of ten (10) laminations is rotated or arcuately offset about the rotation axis "A" an amount equal to one pole pitch angle 176 with respect to the axially adjacent, previous lamination 156. As such, this enables the stack of ten (10) laminations to form a repeating pattern of the deflectable magnet retaining tab 162, as shown in FIG. 13, where a respective magnet slot 150 contains one (1) magnet retaining tab 162 in each stack of ten (10) laminations.

Figure 14:
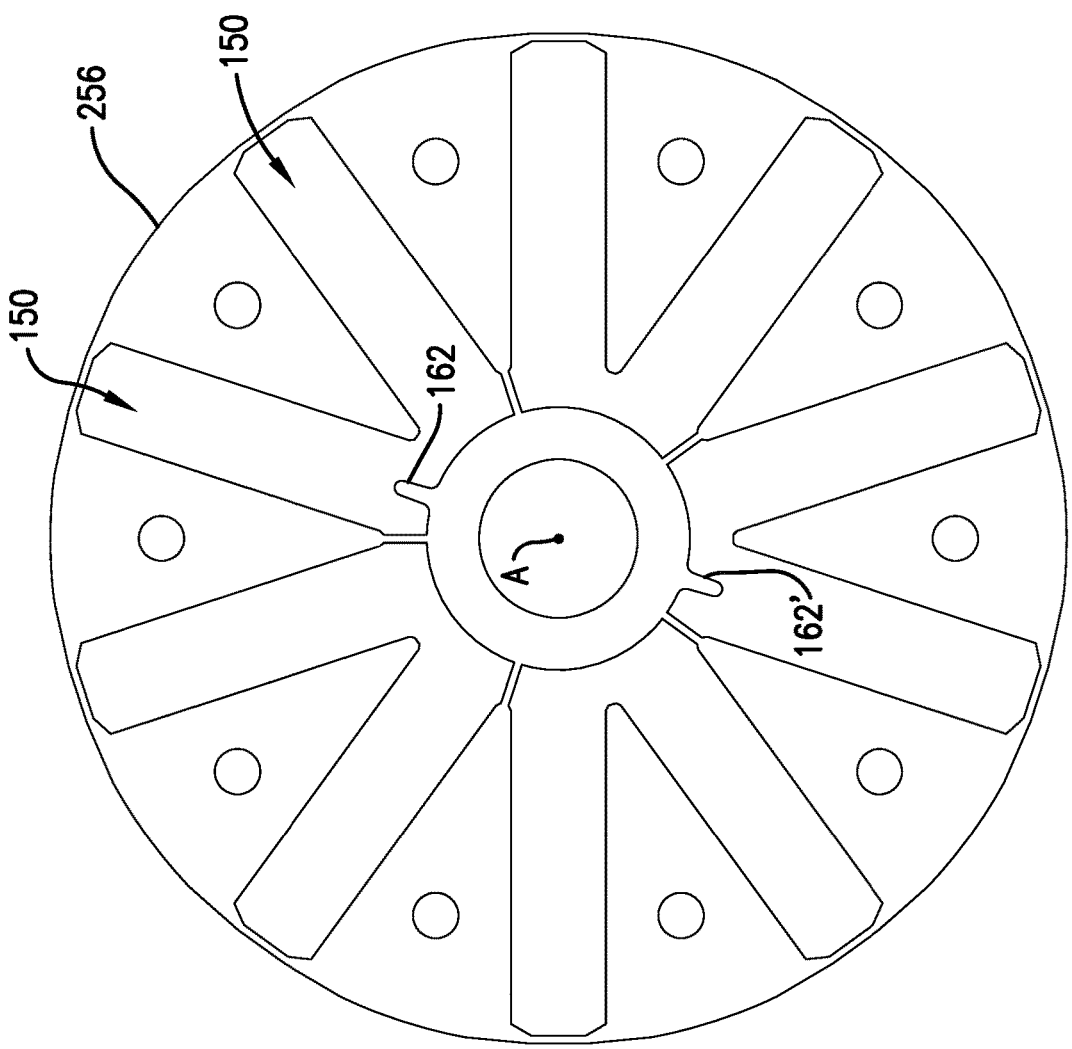
FIG. 14 is a plan view of another alternative lamination that may be used to construct a rotor core, similar to that shown in FIG. 4.
Figure 15:
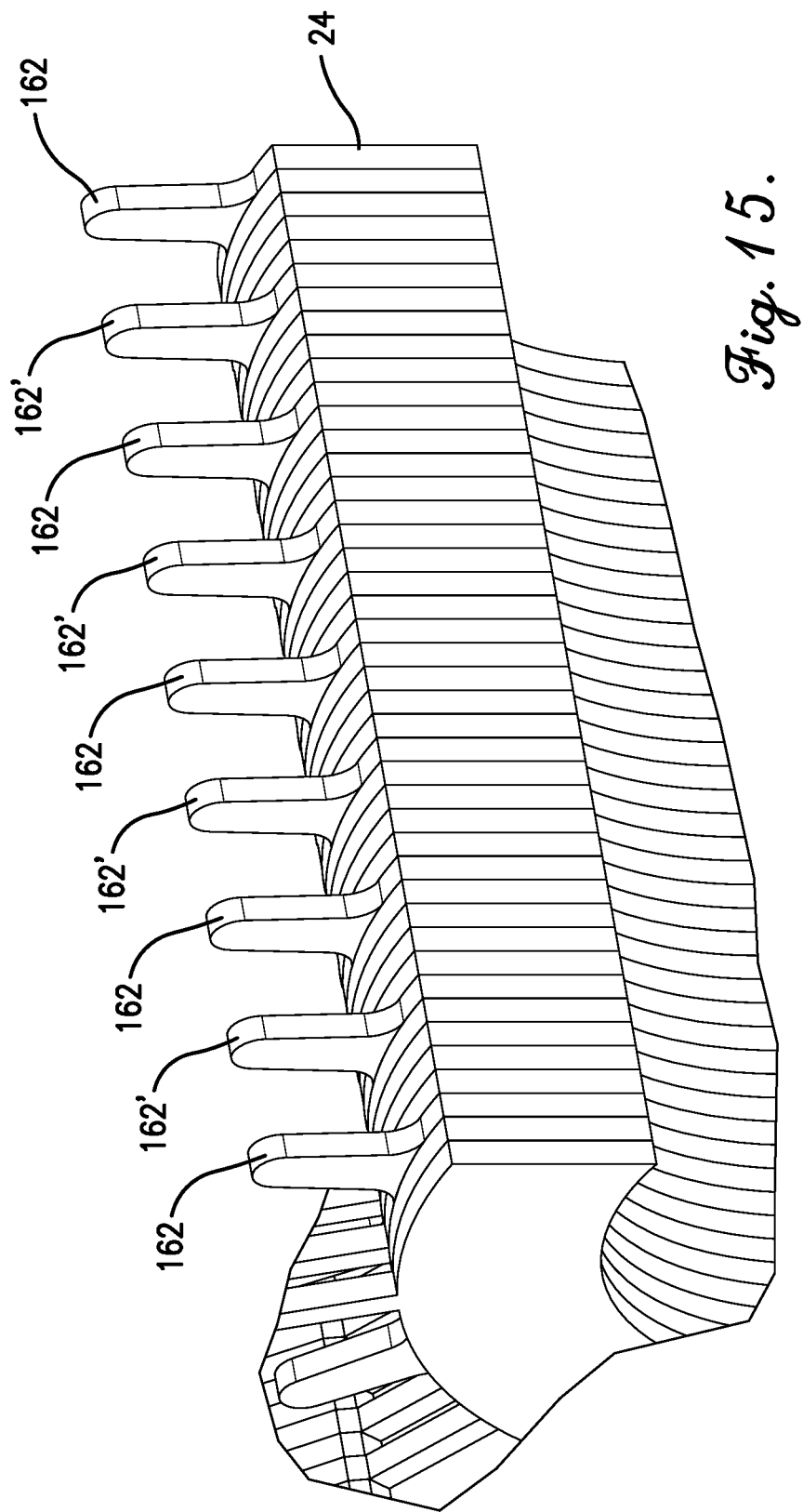
FIG. 15 is an enlarged section view of a portion of the rotor core constructed with a stack of the laminations shown in FIG. 14.

FIG. 14 is a front view of an alternative lamination 256 that may be used to construct a rotor core, similar to that shown in FIG. 4. FIG. 15 is an enlarged section view of a portion of the rotor core constructed with a stack of laminations 256. In this embodiment, the lamination 256 is fabricated substantially similar to the lamination 156 described above. However, in the illustrated embodiment, the lamination 256 is fabricated with the magnet slots 150 and magnet retaining tab 162 having one hundred and eighty degrees (180°) rotational symmetry about the rotation axis (indicated by point "A"). As such, in this example, the lamination 256 includes an additional magnet retaining tab indicated as 162'. As with the lamination 156 described above, the lamination 256 does not include any support posts.

The magnet retaining tab 162' is substantially the same as the magnet retaining tab 162 but is positioned one hundred and eighty degrees (180°) from the magnet retaining tab 162. Accordingly, a stack of ten (10) laminations 256 rotated relative to each other as described herein defines a repeating pattern of deflectable magnet retaining tabs 162 and 162', as shown in FIG. 15. As such, a respective magnet slot 150 includes two (2) regularly spaced magnet retaining tabs 162 and 162' in each stack of ten (10) laminations.

Figure 16:
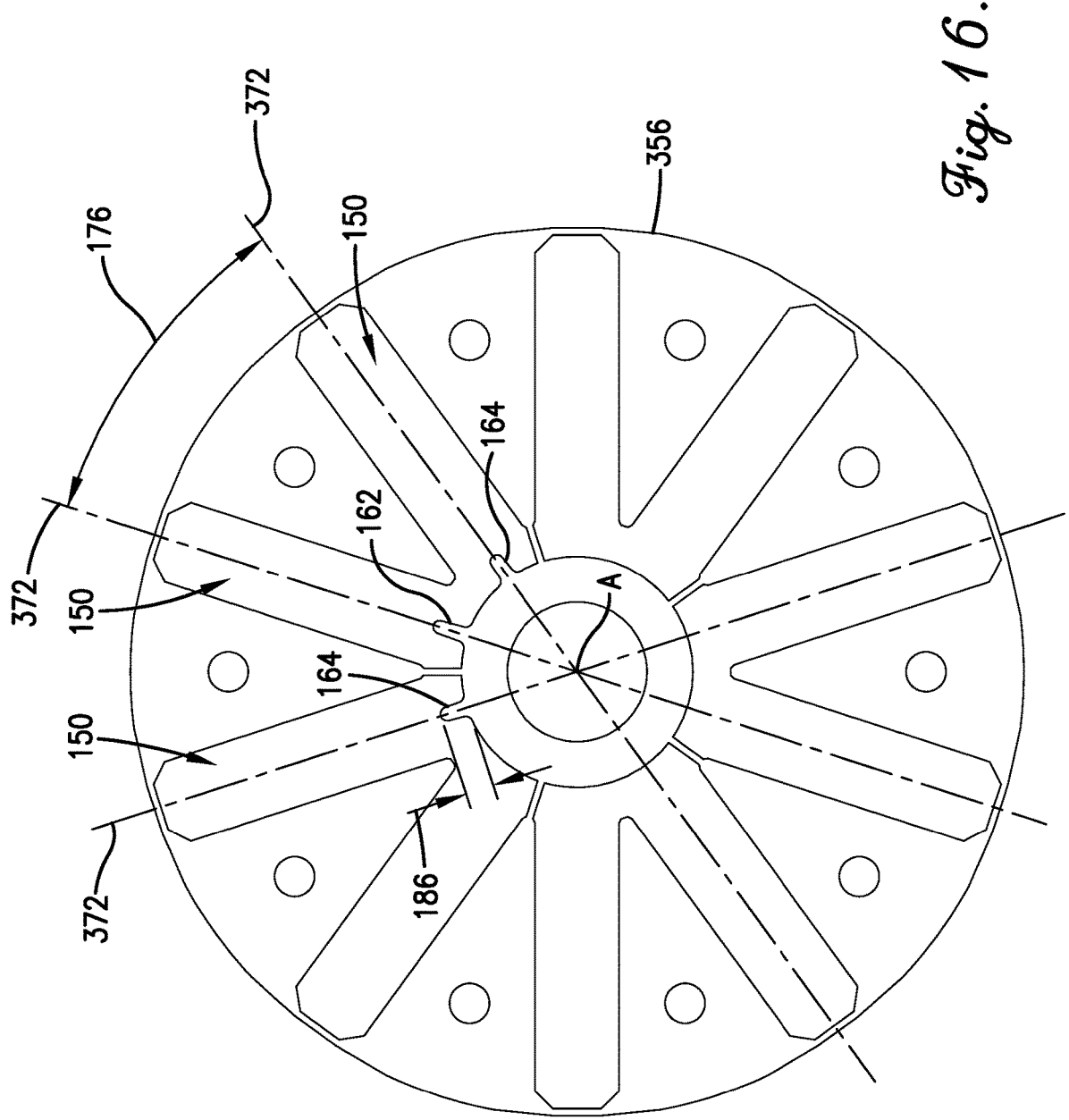
FIG. 16 is a plan view of yet another alternative lamination that may be used to construct a rotor core, similar to that shown in FIG. 4.
Figure 17:
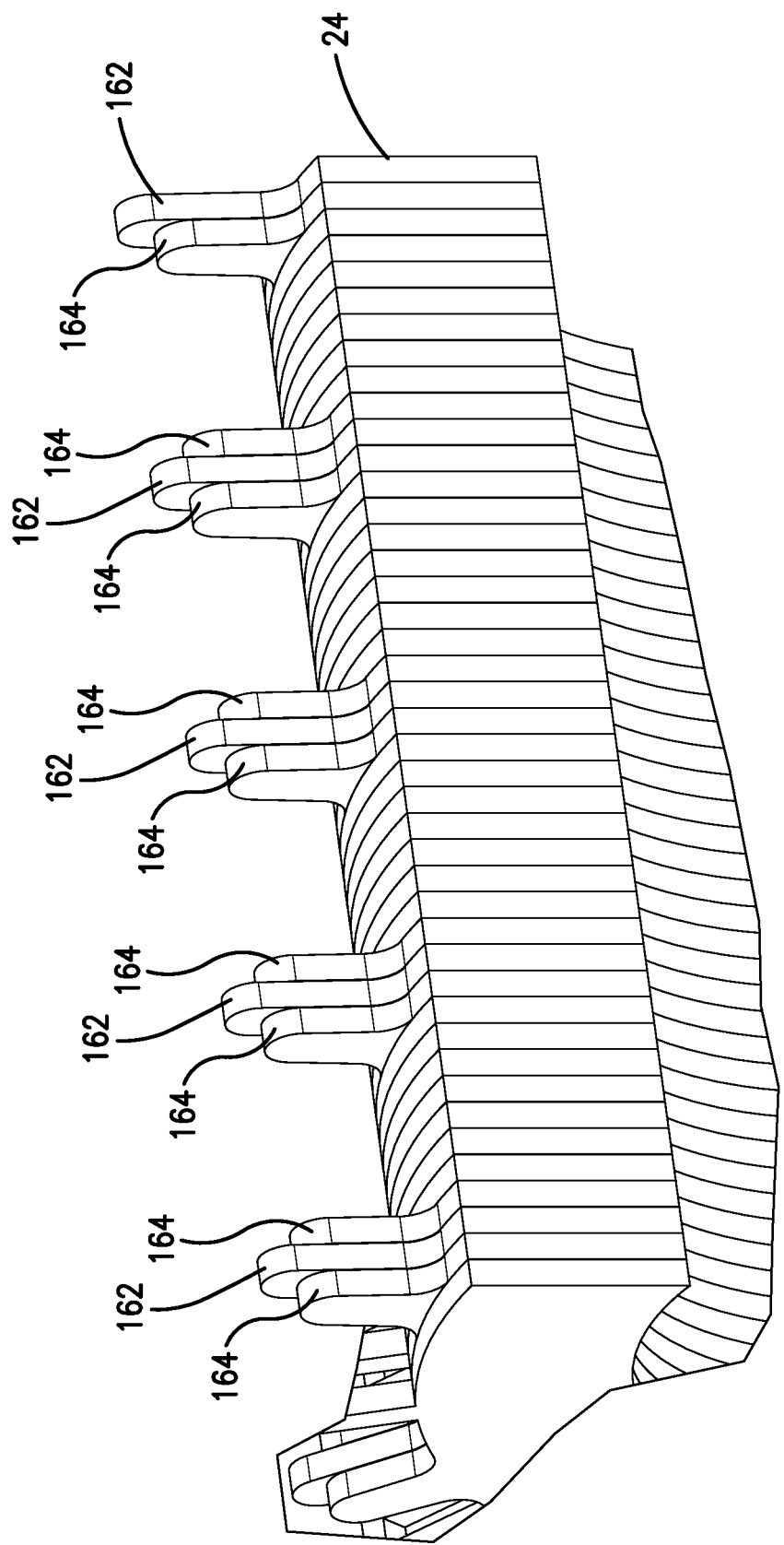
FIG. 17 is an enlarged section view of a portion of the rotor core constructed with a stack of the laminations shown in FIG. 16.

FIG. 16 is a front view of an alternative lamination 356 that may be used to construct a rotor core, similar to that shown in FIG. 4. FIG. 17 is an enlarged section view of a portion of the rotor core constructed with a stack of laminations 356. In the illustrated embodiment, the lamination 356 is similar to the lamination 156 (shown in FIG. 12) but includes two (2) support posts 164. A respective support post 164 is positioned in each magnet slot 150 positioned adjacent to the magnet slot 150 containing the magnet retaining tab 162. That is, each magnet slot 150 on either side of the magnet retaining tab 162 contains a respective support post 164. Each support post 164 is substantially centered in its respective magnet slot 150. Each support post 164 extends along a central slot axis 372.

The support posts 164 are formed as radially extending posts having a predetermined width that is substantially the same as the predetermined width 182 of the magnet retaining tab 162. In addition, the support posts 164 extend radially outward a predetermined length 186, which is selected to provide a length to the support posts 164 to partially support an axially adjacent magnet retaining tab 162 against bending in the axial direction of the rotor core 24. That is, the length of the support posts 164 is limited to a distance less than the predetermined length 184 of the magnet retaining tab 162. The predetermined length 186 can be selected to provide a predetermined amount of support to the magnet retaining tab 162.

A stack of ten (10) laminations 356 are placed in face-to-face contact with each other. Each lamination 356 in the stack of ten (10) laminations is rotated or arcuately offset about the rotation axis "A" an amount equal to one pole pitch angle 176 with respect to the adjacent, previous lamination 356. As such, this enables the stack of ten (10) laminations 356 to form a repeating pattern of the deflectable magnet retaining tab 162 and support posts 164, as shown in FIG. 17, where a support post 164 is positioned against each axial face of a single magnet retaining tab 162.

Figure 18:
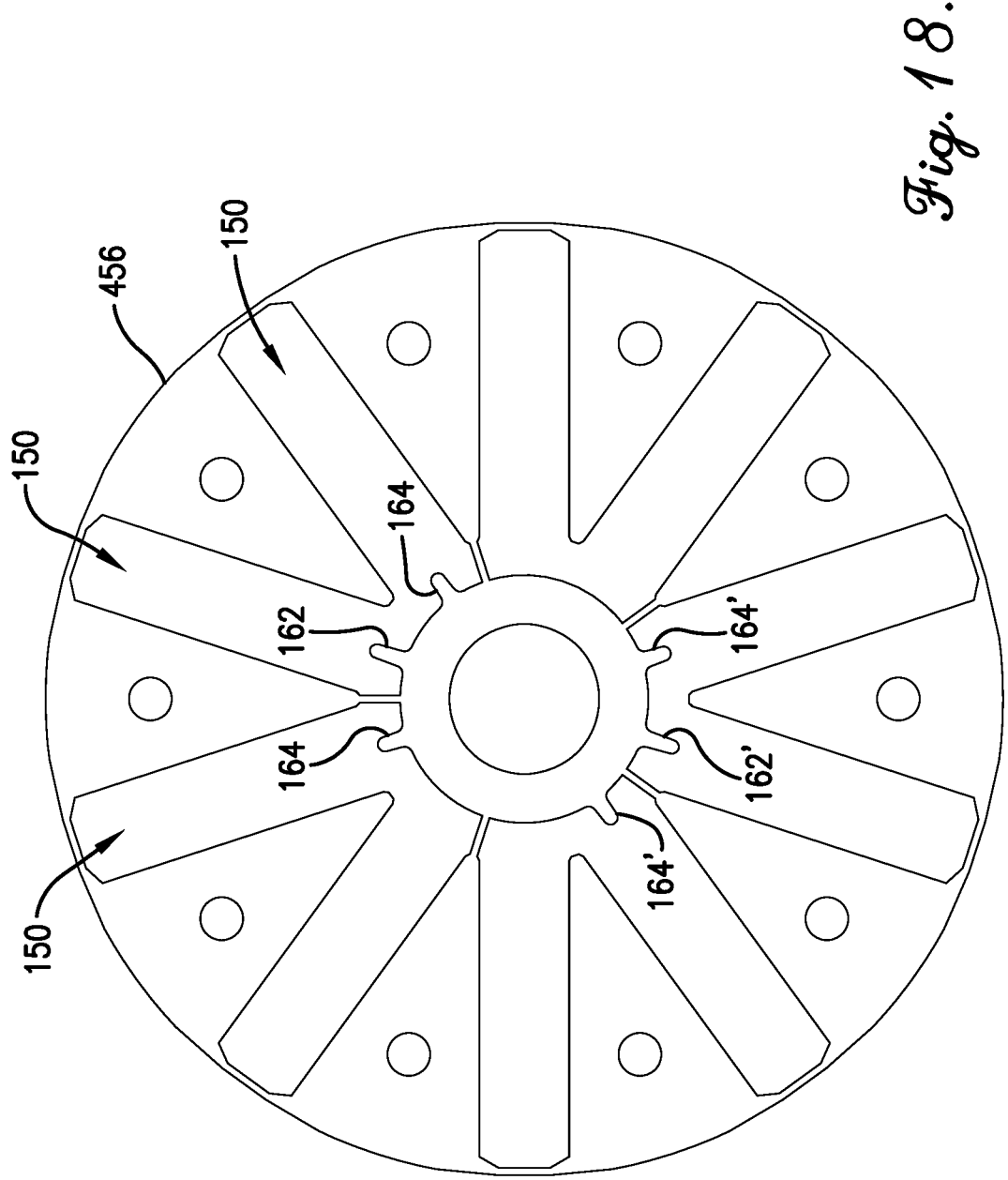
FIG. 18 is a plan view of another alternative lamination that may be used to construct a rotor core, similar to that shown in FIG. 4.
Figure 19:
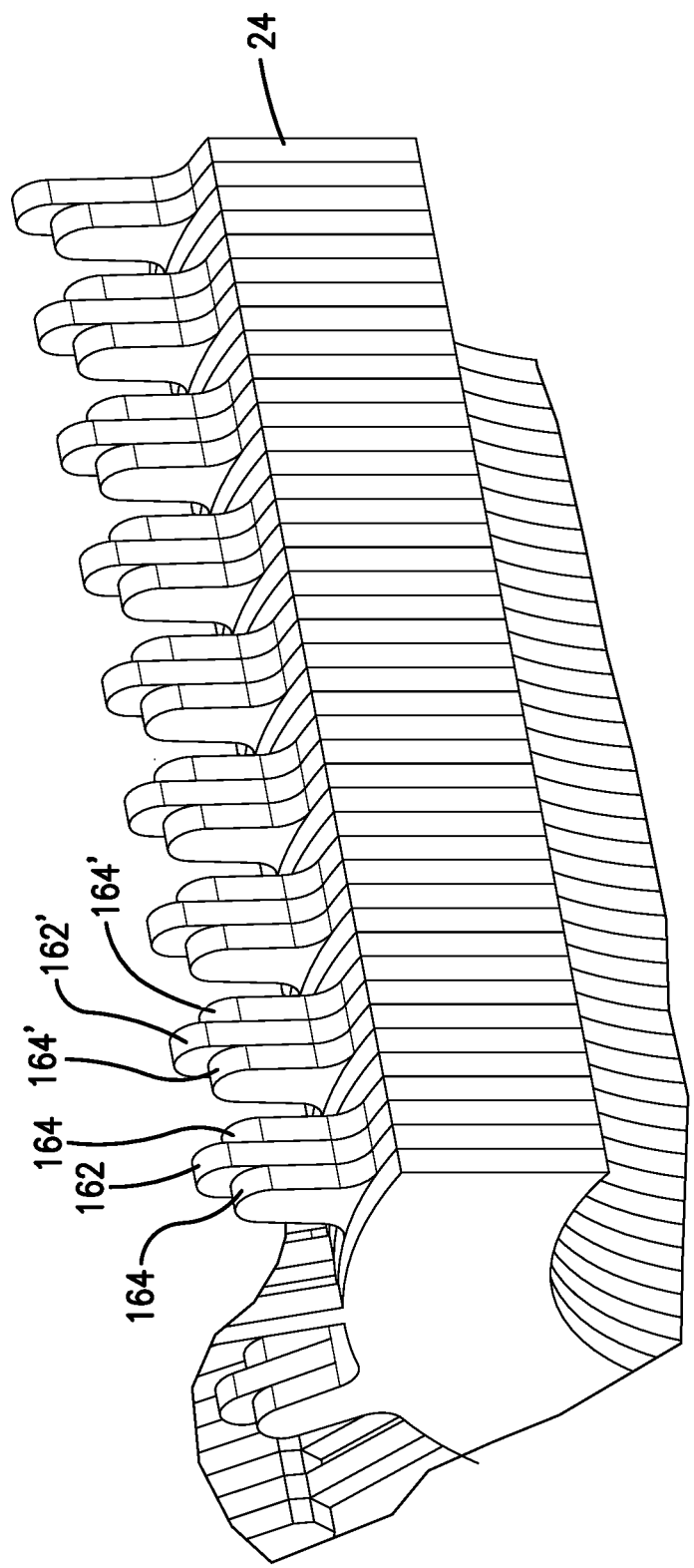
FIG. 19 is an enlarged section view of a portion of the rotor core constructed with a stack of the laminations shown in FIG. 18.

FIG. 18 is a front view of an alternative lamination 456 that may be used to construct a rotor core, similar to that shown in FIG. 4. FIG. 19 is an enlarged section view of a portion of the rotor core constructed with a stack of laminations 456. In the illustrated embodiment, the lamination 456 is fabricated substantially similar to lamination 356, described above. The lamination 456 is fabricated with the magnet slots 150, magnet retaining tab 162, and support posts 164 having one hundred and eighty degrees (180°) rotational symmetry about the rotation axis (indicated by point "A"). In this example, the lamination 456 includes an additional magnet retaining tab indicated as 162' and pair of adjacent support posts 164'. The magnet retaining tab 162' and supports posts 164' are substantially the same as the magnet retaining tab 162 and support posts 164 but are positioned one hundred and eighty degrees (180°) therefrom. As such, a stack of ten (10) laminations 456 rotated relative to each other as described herein defines a repeating pattern of deflectable magnet retaining tabs 162 and 162', each having adjacent support posts 164 and 164', respectively, as shown in FIG. 19.

Figure 20:
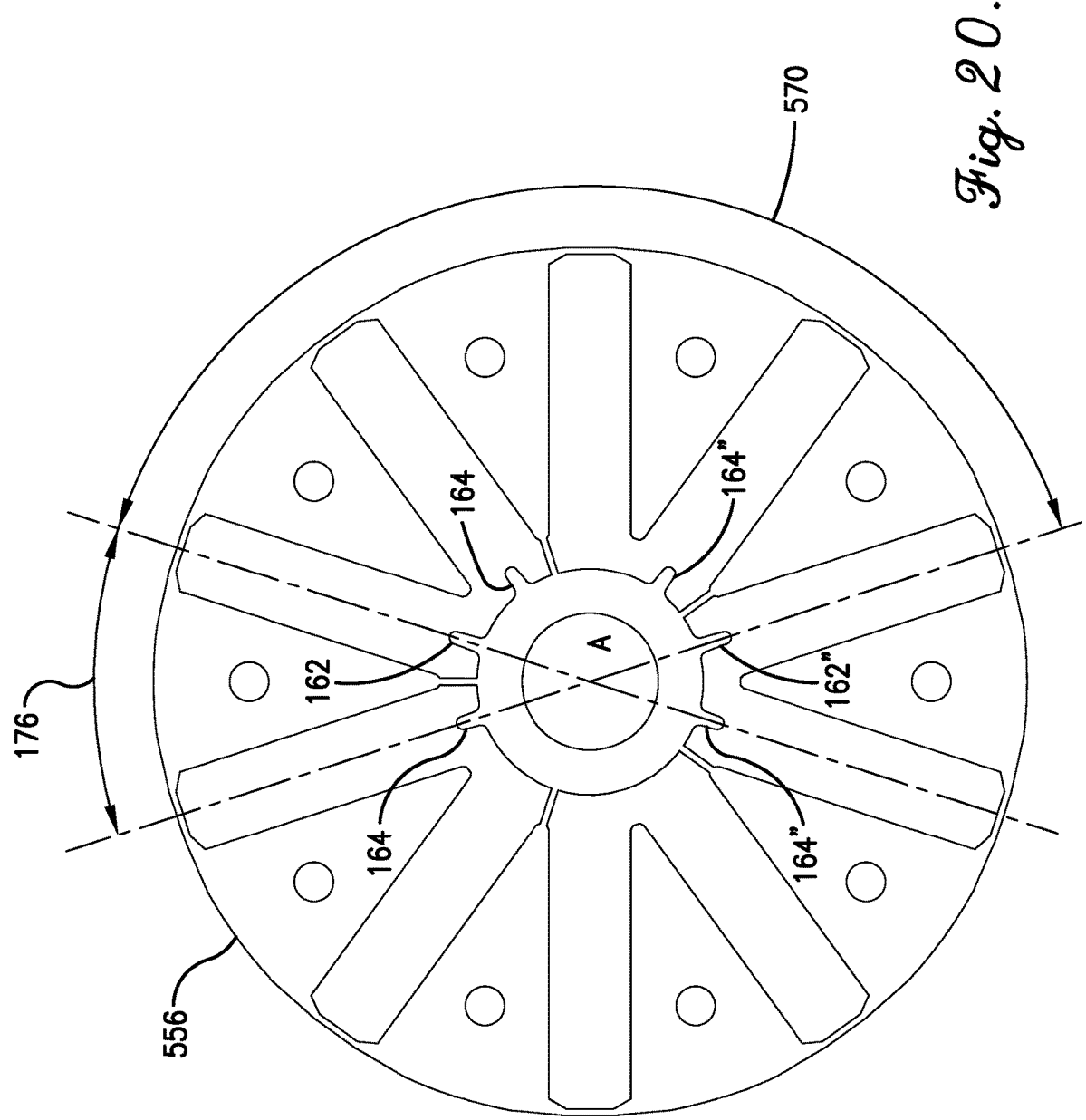
FIG. 20 is a plan view of yet another alternative lamination that may be used to construct a rotor core, similar to that shown in FIG. 4.
Figure 21:
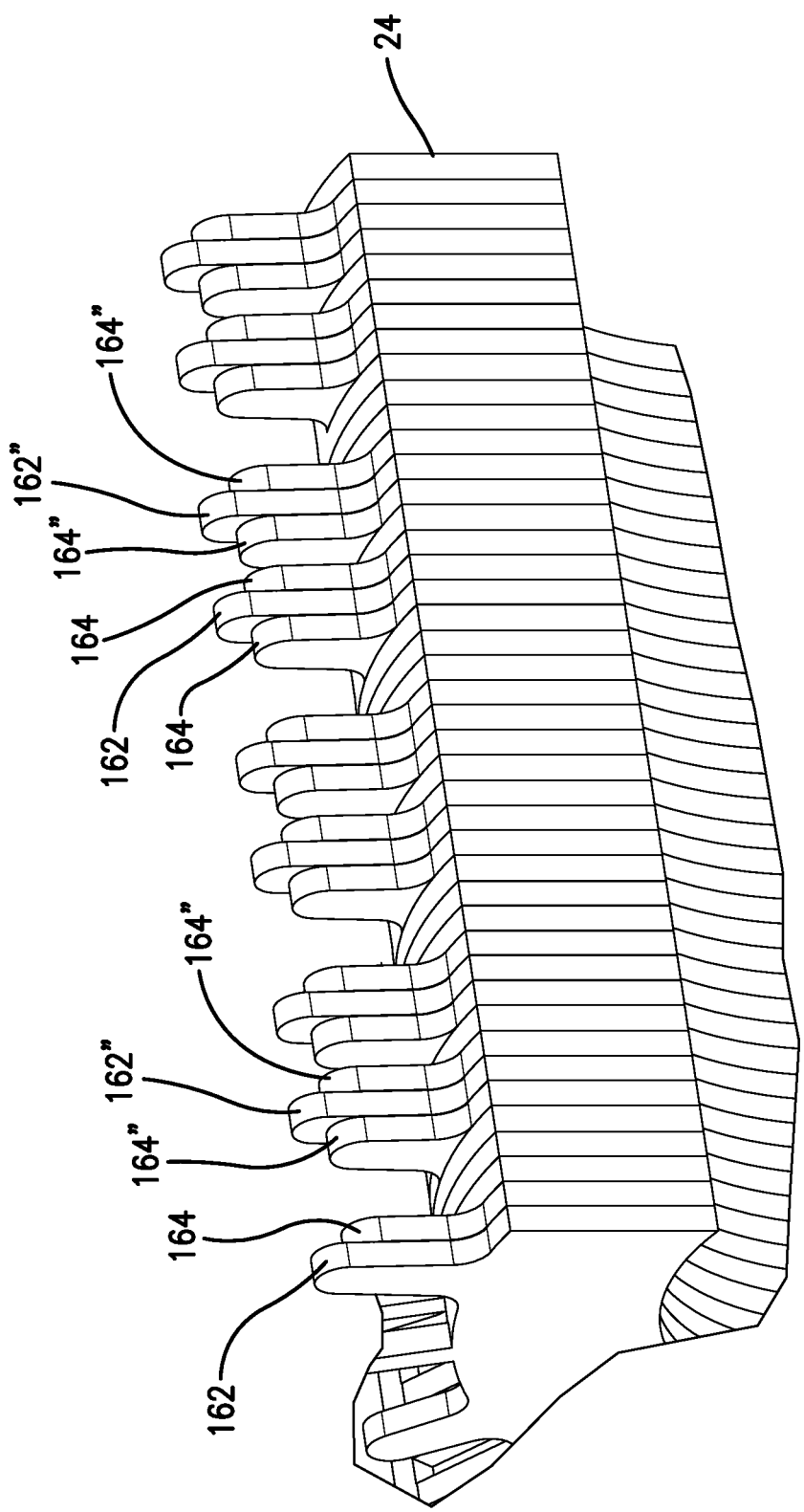
FIG. 21 is an enlarged section view of a portion of the rotor core constructed with a stack of the laminations shown in FIG. 20.

FIG. 20 is a front view of an alternative lamination 556 that may be used to construct a rotor core, similar to that shown in FIG. 4. FIG. 21 is an enlarged section view of a portion of the rotor core constructed with a stack of laminations 556. In the illustrated embodiment, the lamination 556 is fabricated with the magnet slots 150, retaining tab 162, and support posts 164 having a rotational symmetry about the rotation axis (indicated by point "A") of four (4) pole pitch angles, as indicated by reference character 570. In this example, the lamination 556 includes an additional magnet retaining tab indicated as 162" and pair of adjacent support posts 164". The magnet retaining tab 162" and supports posts 164" are substantially the same as the magnet retaining tab 162 and support posts 164 but are positioned four (4) pole pitch angles 570 (e.g., one hundred and forty-four degrees) (144°) therefrom. As such, a stack of ten (10) laminations 556 rotated relative to each other as described herein defines a repeating pattern of deflectable magnet retaining tabs 162 and 162", each having adjacent support posts 164 and 164", respectively, as shown in FIG. 21.

Figure 22:
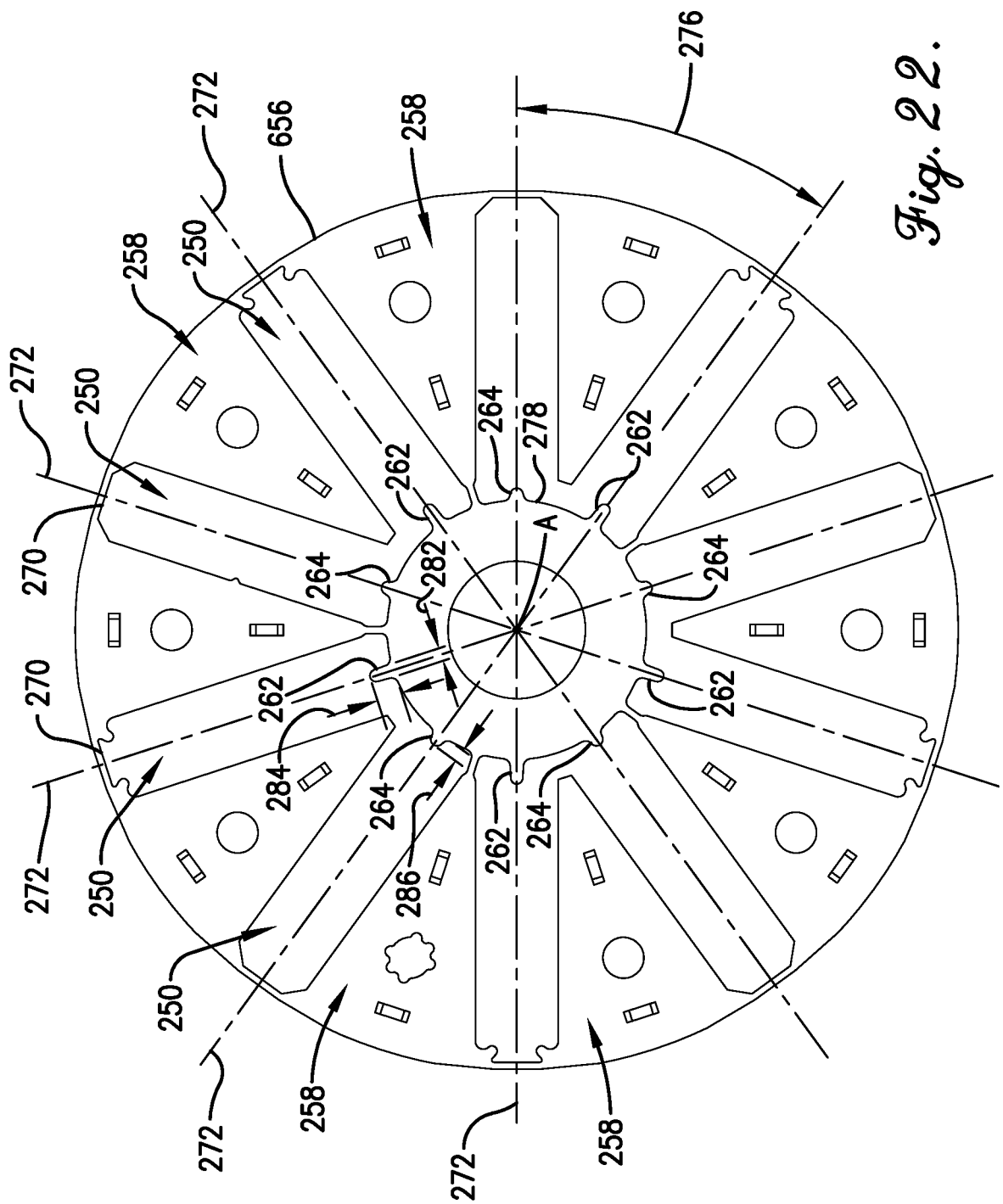
FIG. 22 is a plan view of an alternative lamination that may be used to construct a rotor core, similar to that shown in FIG. 4.
Figure 23:
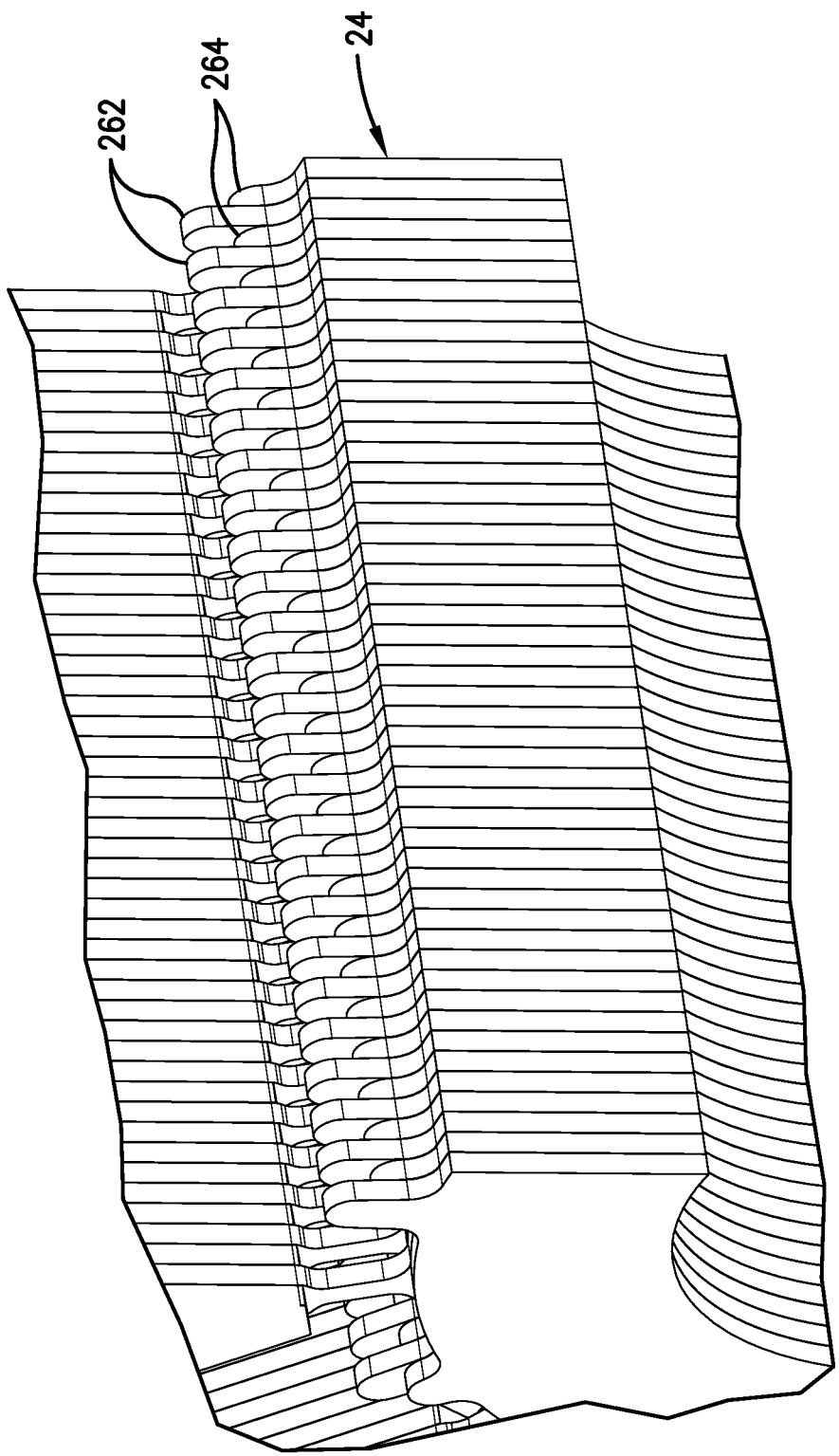
FIG. 23 is an enlarged section view of a portion of the rotor core constructed with a stack of laminations shown in FIG. 22.

FIG. 22 is a front view of an alternative lamination 656 that may be used to construct a rotor core, similar to that shown in FIG. 4. FIG. 23 is an enlarged section view of a portion of the rotor core constructed with a stack of laminations 656. The lamination 656 is fabricated substantially similar to lamination 56 (shown in FIGS. 8-10). In the illustrated embodiment, the lamination 656 includes a plurality of deflectable magnet retaining tabs 262 and support posts 264, each located in a respective magnet slot 250 and arranged in a circumferential alternating pattern.

Each deflectable magnet retaining tab 262 is formed substantially similar to the deflectable magnet retaining tabs 62 (shown in FIGS. 8-10). The deflectable magnet retaining tabs 262 extend radially from a central body portion 278 of the lamination 656. The magnet retaining tabs 262 are substantially centered in respective magnet slots 250, extending along the respective central slot axis 272. The magnet retaining tabs 262 are located opposite the outer magnet surfaces 270 to facilitate providing an outward radial force against a respective magnet, such as the magnet 48 (shown in FIG. 3), thereby forcing the magnet 48 toward the outer magnet surface 270.

Each magnet retaining tab 262 is formed as a radially extending post having a predetermined width 282 that enables the lamination 656 to function as described herein. In addition, each magnet retaining tab 262 extends radially outward from the central body portion 278 a predetermined length 284 selected to engage with the radially inward side 102 of the permanent magnet 48 to exert a reactive force against the magnet 48 to secure the magnet in place.

Each support post 264 is formed substantially similar to the support posts 64 (shown in FIGS. 8-10). Each support post 264 is includes a radially extending post having a predetermined width that is substantially the same as the predetermined width 282 of the magnet retaining tab 262. In addition, the support posts 264 extend radially outward a predetermined length 286, which is selected to provide a length to the support posts 264 to partially support an axially adjacent magnet retaining tab 262 against bending in the axial direction of the rotor core 24. That is, the length of the support posts 264 is limited to a distance less than the predetermined length 284 of the magnet retaining tab 262. The predetermined length 286 can be selected to provide a predetermined amount of support to the magnet retaining tab 262.

Referring to FIG. 23, in the exemplary embodiment, a stack of fifty (50) laminations 656 is provided. The laminations 656 are placed in face-to-face contact with each other. Each lamination 656 in the stack of fifty (50) laminations is rotated or arcuately offset about the rotation axis "A" an amount equal to one pole pitch angle 276 with respect to the axially adjacent, previous lamination 656. As such, this enables the stack of fifty (50) laminations to form an alternating pattern of the deflectable magnet retaining tabs 262 and support posts 264, as shown in FIG. 23.

Figure 24:
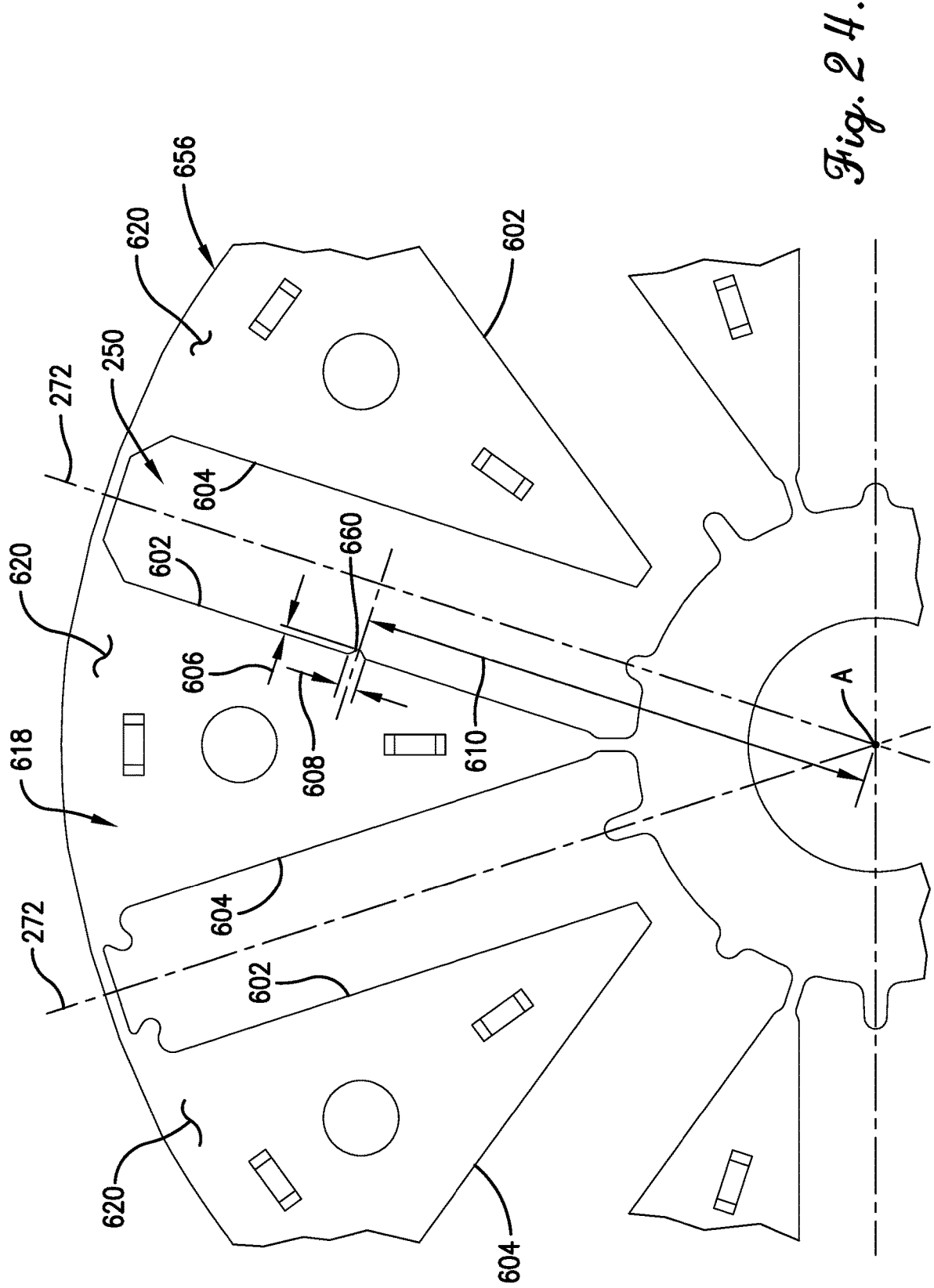
FIG. 24 is an enlarged view of a portion of the lamination shown in FIG. 22, illustrating an optional magnet retention feature.

FIG. 24 is an enlarged view of a portion of the lamination 656 shown in FIG. 22, illustrating an optional magnet retention feature 660. While the magnet retention feature 660 is depicted with the lamination 656, it is noted that the magnet retention feature 660 may be included with any one of the lamination embodiments described herein. For example, one or more of the laminations 56 (shown in FIG. 8), 156 (shown in FIG. 12), 256 (shown in FIG. 14), 356 (shown in FIG. 16), 456 (shown in FIG. 18), 556 (shown in FIG. 20), and 765 (shown in FIG. 25) may include one or more magnet retention features 660.

In the exemplary embodiment, an outer body portion 618 of the lamination 656 is defined by a plurality of pole segments 620 arcuately arranged about the rotation axis "A." The pole segments 620 are preferably evenly spaced, defining the magnet slots 250 between adjacent pairs of the pole segments 620. Preferably, each pole segment 620 includes a pair of sidewalls, inner sidewall 602 and inner sidewall 604, which define, in part, a respective magnet slot 250 therebetween.

In the exemplary embodiment, at least one magnet slot 250 has at least one magnet retention feature 660 projecting therein. FIG. 24 depicts a single magnet retention feature 660 projecting into a single magnet slot 250. It is noted however, that any number of the magnet slots 250 of the lamination 656 may be associated with respective magnet retention features 660 projecting therein. In the exemplary embodiment, the magnet retention feature 660 is a protrusion that extends substantially circumferentially from a first sidewall 602. The magnet retention feature 660 may also be referred to as a protruding member, a burr, and/or a tab. The magnet retention feature 660 facilitates maintaining a position of the magnets 48 (shown in FIG. 3) within the magnet slots 250.

As described herein, the rotor laminations (e.g., laminations 56, 156, 256, 356, 456, 556, or 656) are arranged in a stack of at least ten (10) laminations. The laminations are placed in face-to-face contact with each other and each lamination in the stack is rotated or arcuately offset about the rotor rotation axis an amount equal to one pole pitch angle with respect to the adjacent, previous lamination. As such, this enables the stack of ten (10) laminations to form a repeating pattern of the magnet retention feature 660, where at least one (1) magnet retaining feature 660 projects into each of the ten (10) magnet slots (e.g., magnet slots 50, 150, or 250). As such, to facilitate maintaining a position of the magnets 48, the magnet retention feature 660 contacts a circumferential facing surface of the magnet 48 and biases the magnet 48 toward the second sidewall 604.

In the exemplary embodiment, the magnet retention feature 660 is formed as a generally triangular-shaped protrusion extending outward from the first sidewall 602 into the magnet slot 250 a predefined distance 606. In an example embodiment, the distance 606 is in a range between and including about twelve thousandths of an inch (0.012") and about sixteen thousandths of an inch (0.016"). However, in other aspects of the present invention, the distance 606 may include any alternative measures that enable the magnet retention feature 660 to function as described herein.

Furthermore, the magnet retention feature 660 has a predefined width 608. In an example embodiment, the width 608 is in a range between and including about thirty thousandths of an inch (0.030") and about forty thousandths of an inch (0.040"). However, in other aspects of the present invention, the width 608 may include any alternative measures that enable the magnet retention feature 660 to function as described herein.

In the exemplary embodiment, the magnet retention feature 660 is located radially outward from the rotation axis "A" a predefined distance 610. As depicted in FIG. 24, in the exemplary embodiment, the predefined distance 610 is selected to position the magnet retention feature 660 about halfway along a radial extent of the first sidewall 602, or about halfway along a radial length of the magnet slot 250. In an example embodiment, the distance 610 is in a range between and including about one and twenty-five hundredths of an inch (1.25") and about one and thirty-five hundredths of an inch (1.35"). However, in other aspects of the present invention, the distance 610 may include any alternative measures that enable the magnet retention feature 660 to function as described herein.

In the exemplary embodiment, the distance 606 and width 608 of the magnet retention feature 660 may be selected to provide the magnet retention feature 660 with a predefined flexibility. That is, the magnet retention feature 660 may be configured to provide slight axial bending with respect to the first sidewall 602. The axial bending accommodates magnets having a wider range of dimensions, for example, due to manufacturing tolerances, to be held in place within the magnet slot 250. Furthermore, the axial bending of the magnet retention feature 660 provides a reactive force against the magnets 48, and in particular, a circumferential face of the magnets 48, to hold the magnets 48 against the opposite second sidewall 604.

Figure 25:
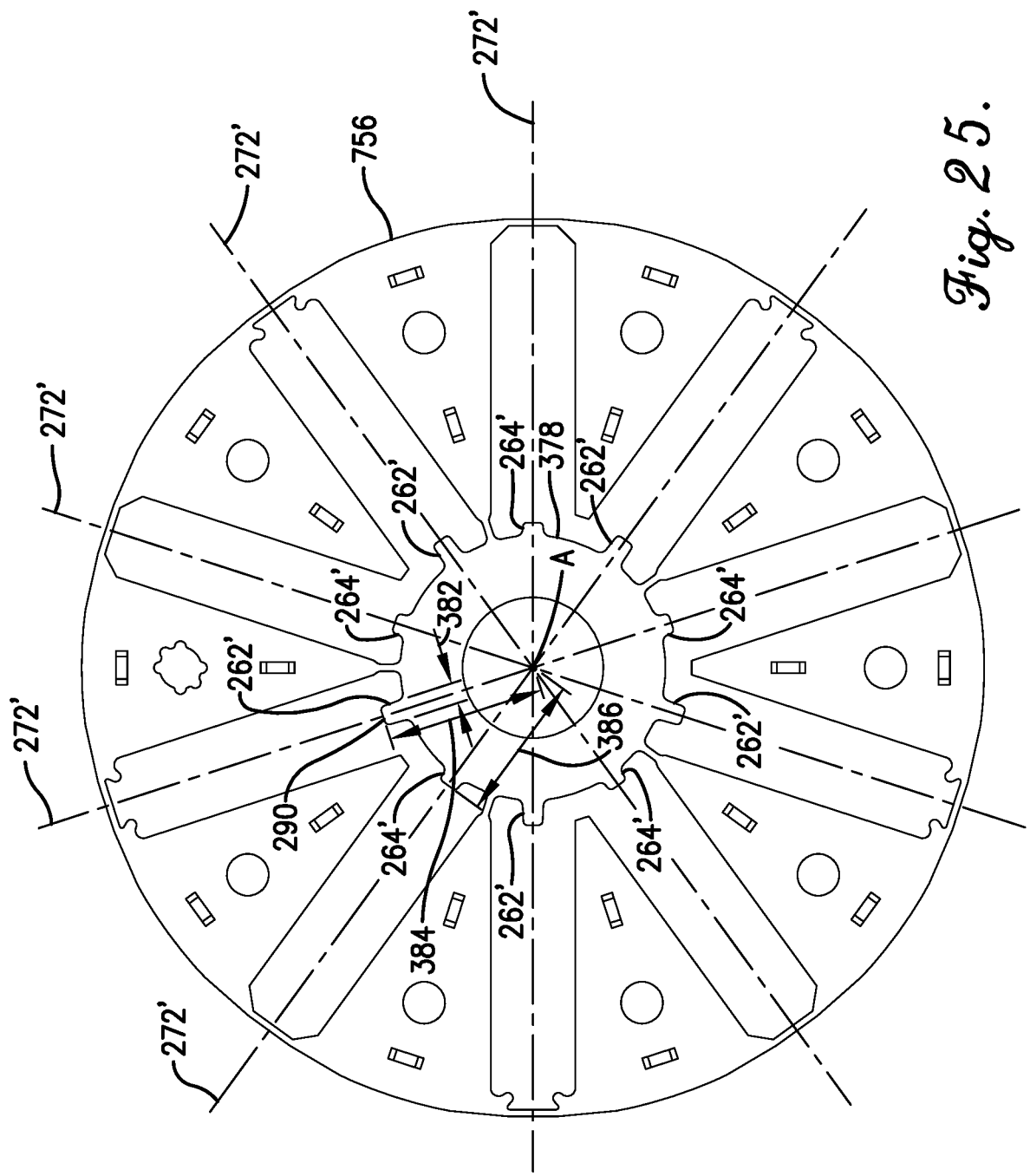
FIG. 25 is a plan view of an alternative lamination that may be used to construct a rotor core, similar to that shown in FIG. 4.

FIG. 25 is a front view of an alternative lamination 756 that may be used to construct a rotor core, similar to that shown in FIG. 4. In the illustrated embodiment, the lamination 756 is fabricated substantially similar to the lamination 656 (shown in FIG. 22). However, in the depicted embodiment, the magnet retaining tabs 262' and the support posts 264' are formed in a generally rectangular shape. It is noted that the configuration of magnet retaining tabs 262' and/or the support posts 264' may be used with any one of the respective lamination embodiments described herein. For example, one or more of the laminations 56 (shown in FIG. 8), 156 (shown in FIG. 12), 256 (shown in FIG. 14), 356 (shown in FIG. 16), 456 (shown in FIG. 18), 556 (shown in FIG. 20), and 656 (shown in FIG. 25) may include the configuration of the magnet retaining tabs 262' and/or the support posts 264' in place of its respective magnet retaining tabs and/or support posts 264'.

In the depicted embodiment, each of the magnet retaining tabs 262' and support posts 264' are formed as radially extending posts having a predetermined base width 382. In the exemplary embodiment, the base width 382 is less than about one-fourth (¼) a width of a corresponding magnet slot 250. In a preferred embodiment of the lamination 756, the base width 382 is in a range between and including about seven hundredths of an inch (0.07") and about eight hundredths of an inch (0.08"). However, in other aspects of the present invention, the base width 382 may include any alternative measures that enable the lamination 756 to function as described herein. The above range increases strength and decreases manufacturing costs of the lamination 756. It is noted that in certain embodiments, the magnet retaining tabs 262' and support posts 264' have a base width 382 along a length of the respective tab or post that is substantially constant or equal in measure. In other embodiments, however, a measure of the base width 382 of the magnet retaining tabs 262' and support posts 264' progressively decreases in a radial outward direction along a radial length of the magnet retaining tabs 262' and support posts 264'. Most preferably, the magnet retaining tabs 262' and support posts 264' may taper radially outward at a taper angle of about five degrees (5°). For example, the taper angle may be in a range between and including about four degrees (4°) and about six degrees (6°).

The magnet retaining tabs 262' extend radially outward a predetermined length 384 as measured from the rotation axis (indicated by point "A"), defining a post portion. A distal retaining tab end of each respective magnet retaining tab 262' defines a substantially planar engagement surface 290, which is oriented generally perpendicular to a corresponding central slot axis 272'. In addition, the planar engagement surface 290 is configured for engagement with a respective magnet 48. In particular, the length 384 is selected to enable the planar engagement surface 290 to engage with a radially inward side 102 of the permanent magnet 48 (shown in FIG. 3) to exert a reactive force against the magnet 48 and secure the magnet 48 in place. In a preferred embodiment of the lamination 756, the length 384 is in a range between and including about fifty-five hundredths of an inch (0.55") and about fifty-seven hundredths of an inch (0.57"). However, in other aspects of the present invention, the length 384 may include any alternative measures that enable the lamination 756 to function as described herein. The above range increases strength and decreases manufacturing costs of the lamination 756.

Likewise, the support posts 264' extend radially outward a predetermined length 386 as measured from the rotation axis "A". The length 386 is selected to provide clearance between a radially outermost support post end of the support post 264' and the magnet 48. Further, the length 386 is selected to provide partial support to an axially adjacent magnet retaining tab 262' against bending in an axial direction of the rotor core 24 (shown in FIG. 4). The predetermined length 386 can be selected to provide a predetermined amount of support to an adjacent magnet retaining tab 262'. In a preferred embodiment of the lamination 756, the length 386 is in a range between and including about five tenths of an inch (0.50") and about fifty-three hundredths of an inch (0.53"). However, in other aspects of the present invention, the length 386 may include any alternative measures that enable the lamination 756 to function as described herein. The above range increases strength and decreases manufacturing costs of the lamination 756.

Advantageously, embodiments of the present invention address the susceptibility of known magnet-retaining techniques to manufacturing tolerances, by providing for one or more deflectable magnet retaining tabs within a limited design space. With deflectable magnet retaining tabs, variations due to manufacturing tolerances result in less variation in magnet insertion force, magnet retention force, and lamination material stress. This results in increasing the manufacturability while decreasing the manufacturing cost of the disclosed rotor assemblies by reducing the demand of manufacturing tolerances and increasing the margin-for-error of newly designed rotor assemblies. Another advantage of the present invention is that the deflectable magnet retaining tabs eliminates the need for secondary magnet retention components and processes, which translates to significant cost reductions and productivity improvements. An added benefit is the ability to press into the rotor core magnets that are already magnetized. Magnetizing magnets within a rotor core is an inefficient process which limits the performance of the electric motor.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The invention claimed is:

1. A rotor assembly for an electric motor, said rotor assembly comprising:
a rotor core comprising a plurality of laminations stacked along a rotational axis of the electric motor, each of the plurality of laminations having a same shape,
said rotor core defining a plurality of radially extending magnet receiving slots extending axially through said rotor core,
each of said laminations comprising a central body portion and an outer body portion, said outer body portion substantially enclosing said central body portion; and
a plurality of magnets, each magnet received in a respective magnet receiving slot of the rotor core,
each of said laminations comprising a deflectable magnet retaining tab that extends radially outward from the central body portion into a corresponding one of the magnet receiving slots;
said magnet retaining tab engaging and being deflected by a corresponding one of the magnets to exert a reactive force against the corresponding one of the magnets.

2. The rotor assembly as claimed in claim 1,
each of said magnet receiving slots defining a slot center point and a central slot axis that extends radially relative to the rotational axis through the slot center point,
said magnet retaining tab being centered in a respective one of the magnet receiving slots, symmetrical about the corresponding central slot axis thereof.

3. The rotor assembly as claimed in claim 2,
said magnet retaining tab including a post portion that extends generally radially relative to the rotational axis,
the post portion including a distal retaining tab end,
the distal retaining tab end defining an engagement surface configured for engagement with the corresponding one of the magnets.

4. The rotor assembly as claimed in claim 3,
said corresponding one of the magnets being axially inserted into a respective magnet receiving slot in a first axial direction,
said magnet retaining tab presenting opposite axial faces, with one of the faces facing the first axial direction,
said magnet retaining tab being configured so that the engagement surface engages the corresponding one of the magnets and is thereby deflected in the first axial direction when the corresponding one of the magnets is inserted in the first axial direction.

5. The rotor assembly as claimed in claim 4,
each of said laminations comprising radially extending first and second support posts,
said first and second support posts positioned axially adjacent the magnet retaining tabs, respectively,
each of said support posts extending alongside and thereby limiting deflection of a respective one of the magnet retaining tabs when engaged with the corresponding one of the magnets.

6. The rotor assembly as claimed in claim 5,
each of said first and second support posts engaging the respective magnet retaining tab along a respective one of the faces.

7. The rotor assembly as claimed in claim 3,
said engagement surface being planar.

8. The rotor assembly as claimed in claim 7,
said corresponding one of the magnets being axially inserted into a respective magnet receiving slot in a first axial direction,
said magnet retaining tab presenting opposite axial faces, with one of the faces facing the first axial direction,
said magnet retaining tab being configured so that the planar engagement surface engages the corresponding one of the magnets and is thereby deflected in the first axial direction when the corresponding one of the magnets is inserted in the first axial direction.

9. The rotor assembly as claimed in claim 8,
each of said laminations comprising radially extending first and second support posts positioned axially adjacent the magnet retaining tabs, respectively,
each of said support posts extending alongside and engaging a respective one of the magnet retaining tabs along a respective one of the faces, thereby limiting deflection of the respective magnet retaining tab when engaged with the corresponding one of the magnets.

10. The rotor assembly as claimed in claim 1,
each of said laminations comprising radially extending first and second support posts,
each of said magnet receiving slots defining a slot center point and a central slot axis that extends radially relative to the rotational axis through the slot center point,
said magnet retaining tabs and said first and second support posts being centered in the magnet receiving slots, symmetrical about the central slot axis of a corresponding one of the magnet receiving slots.

11. The rotor assembly as claimed in claim 1,
each of said laminations comprising radially extending first and second support posts,
said support posts and magnet retaining tabs having a substantially similar base width,
said magnet receiving slots each having a slot width,
said base width being less than about one-fourth (¼) of the slot width.

12. The rotor assembly as claimed in claim 11,
said base width being substantially constant along a radial length of the support posts and magnet retaining tab.

13. The rotor assembly as claimed in claim 11,
said base width progressively decreasing in a radial outward direction along a radial length of the magnet retaining tab and support posts.

14. The rotor assembly as claimed in claim 1,
said outer body portion of each of said laminations including a plurality of arcuately arranged pole segments,
each pole segment including a first inner sidewall and a second inner sidewall,
each of said laminations further including a circumferentially extending magnet retention feature formed on one of the first and second inner sidewalls.

15. The rotor assembly as claimed in claim 1,
said outer body portion of each of said laminations including a plurality of arcuately arranged pole segments,
each pole segment including a first inner sidewall and a second inner sidewall,
adjacent pairs of the pole segments being connected by a planar outer magnet surface,
the corresponding one of the magnet receiving slots defined, in part, by the first inner sidewall of a first one of the pole segments, the second inner sidewall of an adjacent second one of the pole segments, and the connecting planar outer magnet surface,
the corresponding one of the magnet receiving slots having a slot center point and a central slot axis that extends radially relative to the rotational axis through the slot center point,
each of said laminations comprising a pair of distal magnet tabs projecting inwardly from respective outer corners defined by an intersection of the planar outer magnet surface and the first and second inner sidewalls.

16. A rotor core for an electric motor, said rotor core comprising:
a plurality of laminations stacked, one on top of the other, along a rotation axis of the rotor core, each of the plurality of laminations having a same shape,
each of said laminations comprising a central body portion and an outer body portion substantially enclosing the central body portion,
said outer body portion of each of said laminations including a plurality of pole segments, the plurality of pole segments being arcuately arranged and evenly spaced about the rotation axis,
each of said laminations being arcuately offset in a same direction about the rotation axis an amount equal to one pole segment with respect to an axially adjacent lamination,
said plurality of laminations cooperating to define a plurality of radially extending magnet receiving slots that extend axially through the rotor core,
each of said laminations comprising a deflectable magnet retaining tab that extends radially outward from the central body portion into a corresponding one of the magnet receiving slots.

17. The rotor core as claimed in claim 16,
each pole segment including a first inner sidewall and a second inner sidewall,
each of said laminations comprising a plurality of bridge portions, each of said bridge portions defining a respective planar outer magnet surface,
adjacent pairs of said plurality of pole segments being connected by a respective one of said plurality of bridge portions,
the corresponding one of the magnet receiving slots defined, in part, by the first inner sidewall of a first one of the pole segments, the second inner sidewall of an adjacent second one of the pole segments, and the planar outer magnet surface of connecting one of said plurality of bridge portions, wherein an intersection of the planar outer magnet surface and the first and second inner sidewalls define respective outer corners of the corresponding one of the magnet receiving slots,
the corresponding one of the magnet receiving slots having a slot center point and a central slot axis that extends radially relative to the rotational axis through the slot center point,
each lamination comprising a pair of distal magnet tabs, each projecting inwardly from a respective one of the outer corners defined by an intersection of the planar outer magnet surface and the first and second inner sidewalls, each of said distal magnet tabs configured to engage a be deflected by a magnet inserted into the corresponding one of the magnet receiving slots.

18. The rotor core as claimed in claim 16,
each pole segment including a first inner sidewall and a second inner sidewall,
each of said laminations further including a circumferentially extending magnet retention feature formed on one of the first and second inner sidewalls.

19. The rotor assembly as claimed in claim 1,
each of said laminations stacked along the rotational axis of the electric motor in face-to-face contact with an adjacent lamination of said plurality of laminations such that the rotor core extends axially along the rotation axis.

20. The rotor core as claimed in claim 16,
each of said laminations stacked along the rotational axis of the rotor core in face-to-face contact with an adjacent lamination of said plurality of laminations such that the rotor core extends axially along the rotation axis.

\* \* \* \* \*